June 4, 1963

R. W. ALLISON 3,091,995

BOX FORMING MACHINE

Filed Aug. 24, 1959

INVENTOR.
ROBERT W. ALLISON
BY
Bruce & Brosler
HIS ATTORNEYS.

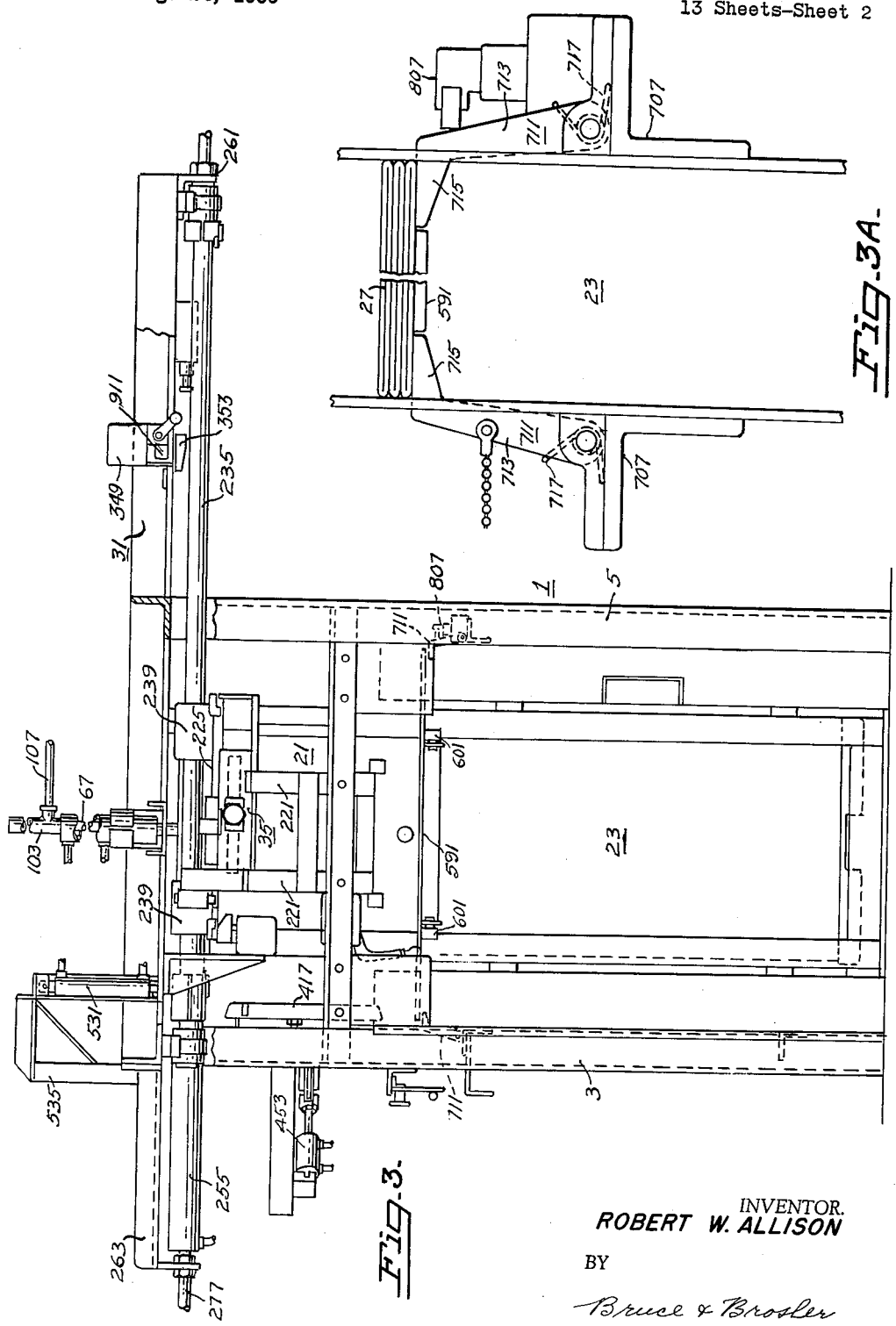

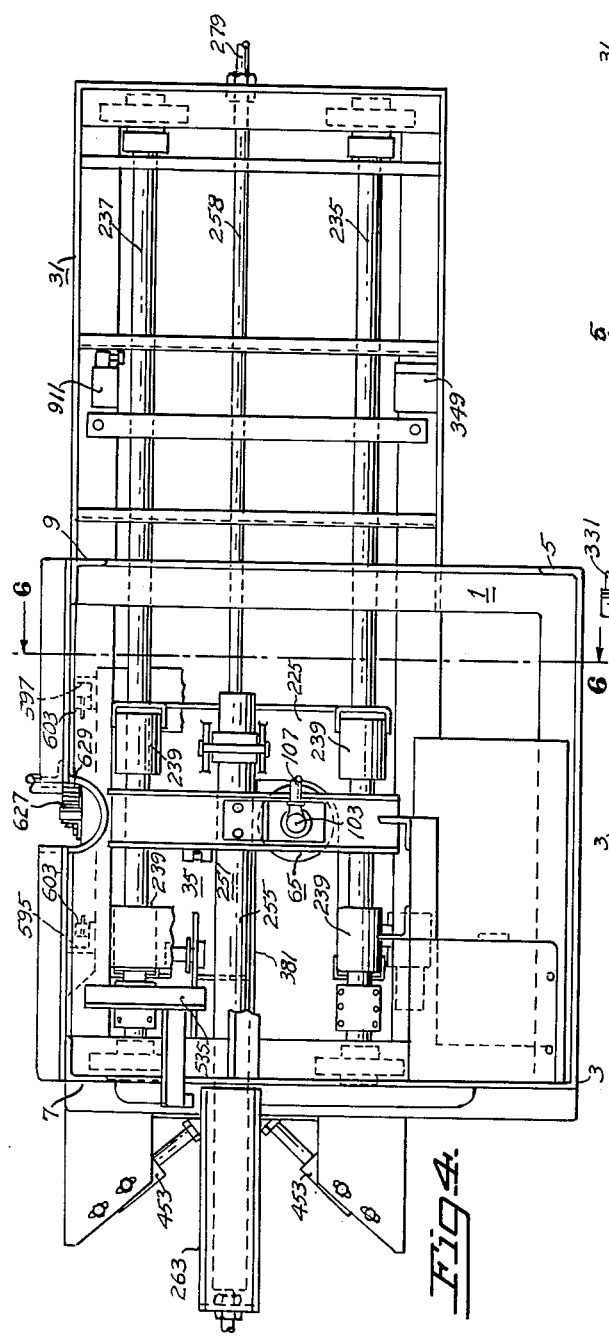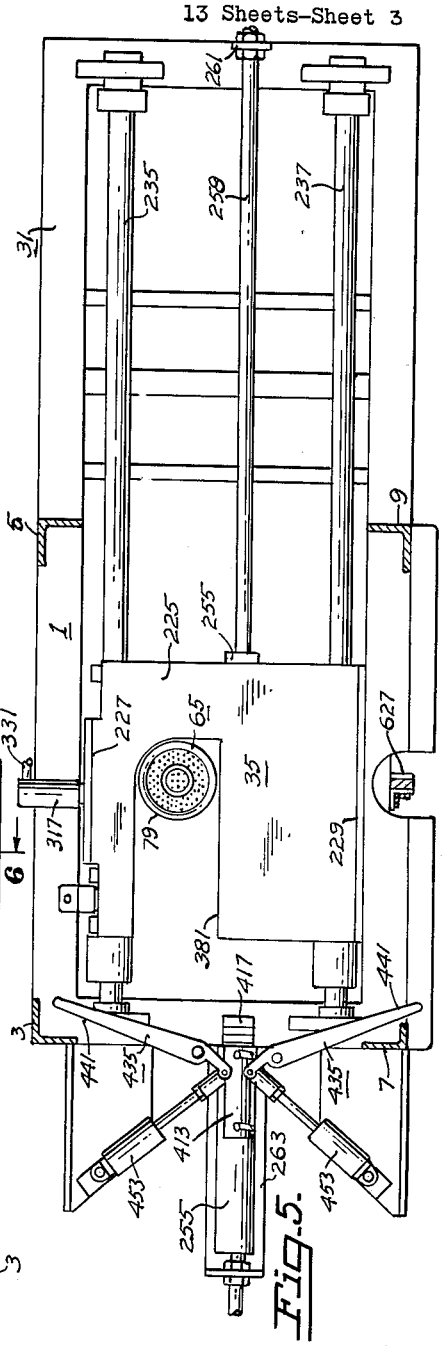
INVENTOR.
ROBERT W. ALLISON
BY
Bruce & Brosler
HIS ATTORNEYS

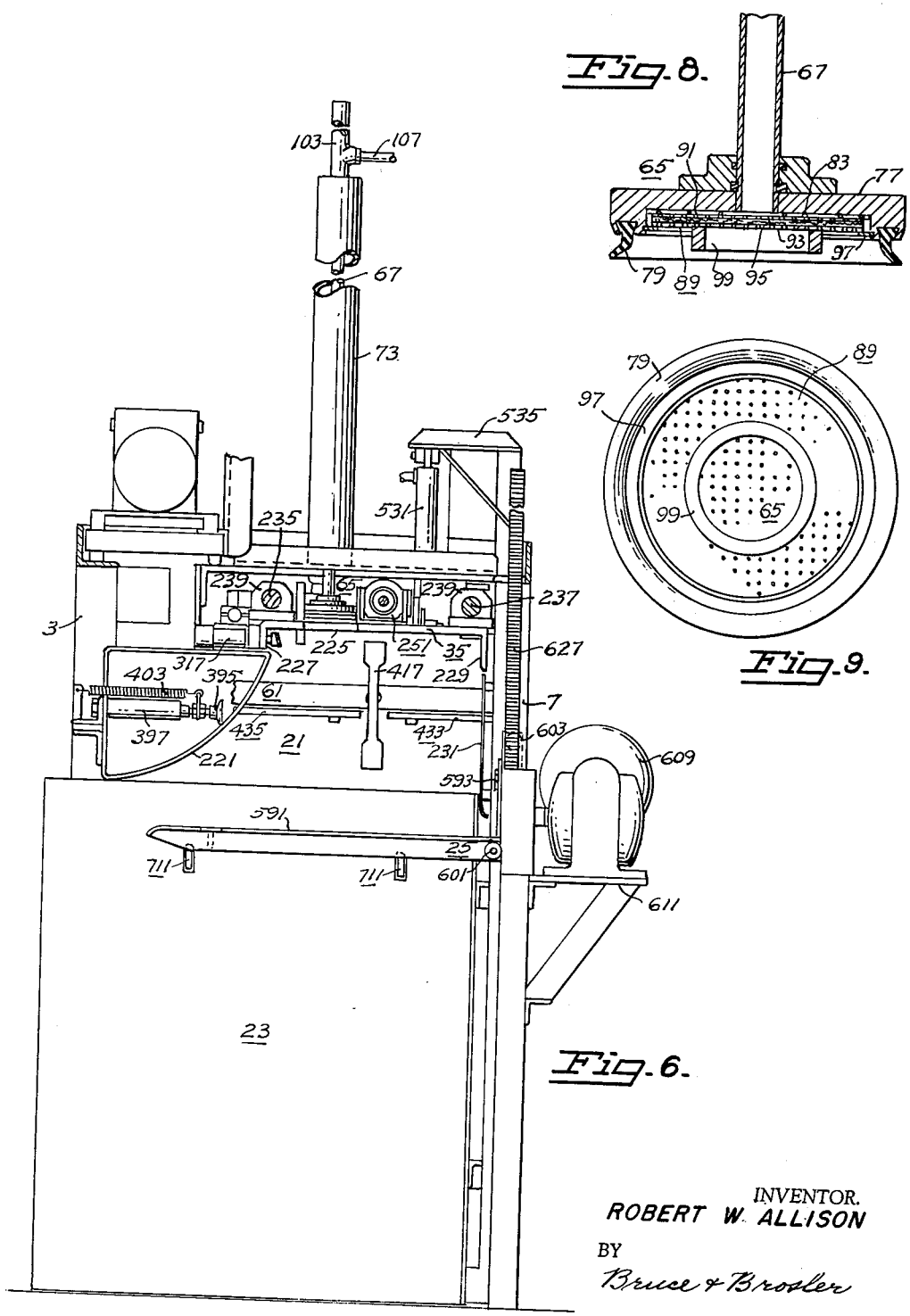

June 4, 1963  R. W. ALLISON  3,091,995
BOX FORMING MACHINE
Filed Aug. 24, 1959  13 Sheets-Sheet 6

INVENTOR.
ROBERT W. ALLISON
BY
*Bruce & Brosler*
HIS ATTORNEYS

June 4, 1963

R. W. ALLISON 3,091,995

BOX FORMING MACHINE

Filed Aug. 24, 1959

INVENTOR.
ROBERT W. ALLISON
BY
Bruce & Brosler
HIS ATTORNEYS

June 4, 1963 R. W. ALLISON 3,091,995
BOX FORMING MACHINE
Filed Aug. 24, 1959 13 Sheets-Sheet 8
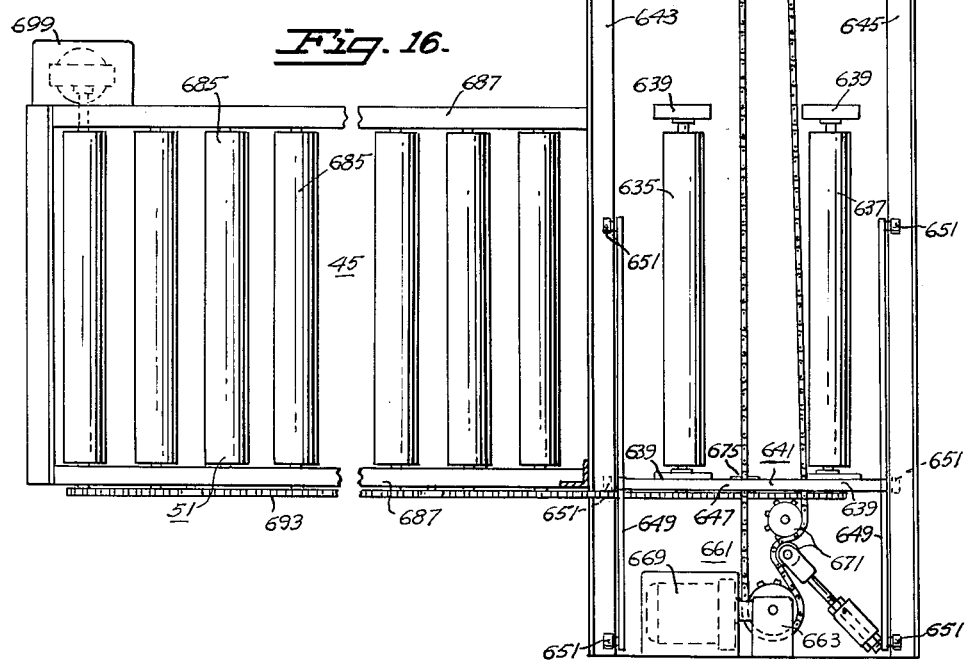
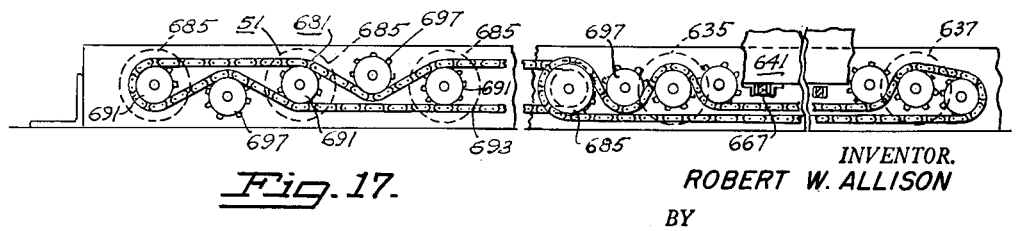
INVENTOR.
ROBERT W. ALLISON
BY
Bruce & Brosler
HIS ATTORNEYS.

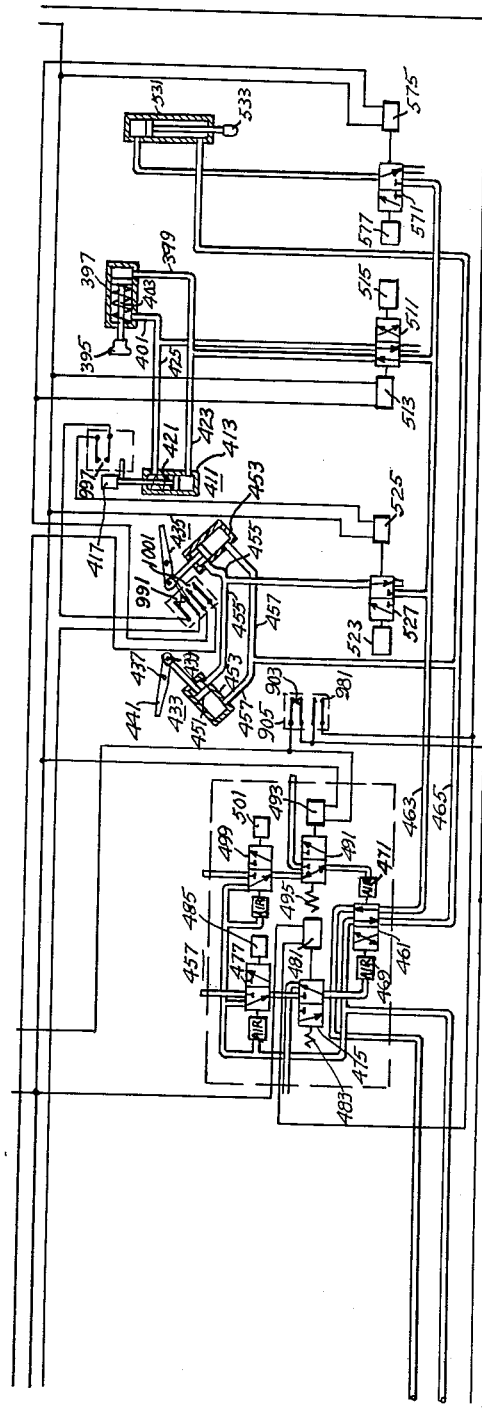

United States Patent Office 3,091,995
Patented June 4, 1963

3,091,995
BOX FORMING MACHINE
Robert W. Allison, Kensington, Calif., assignor to Caral Packaging Machinery, Inc., a corporation of California
Filed Aug. 24, 1959, Ser. No. 835,699
17 Claims. (Cl. 93—53)

My invention relates in general to the field of packaging and more particularly to a machine for setting up or forming boxes of the corrugated fiberboard type from the collapsed condition in which they are normally supplied to their point of use.

In this era of high speed packaging it becomes essential that such boxes be set up or formed at a rate commensurate with the rate at which the packaging equipment can fill the same, and that the forming means be capable of sustained operation, with a minimum of time loss, for any interruption in continued flow of boxes to the packaging equipment, will necessitate corresponding interruptions all along the line.

Among the objects of the present invention are:

(1) To provide a novel and improved box forming machine;

(2) To provide a novel and improved box forming machine which is automatic in its operation throughout;

(3) To provide a novel and improved box forming machine having no flexible hose couplings between components moving relative to one another;

(4) To provide a novel and improved box forming machine which has substantial storage capacity;

(5) To provide a novel and improved box forming machine which will maintain continuity of operation in spite of intermittent loading;

(6) To provide a novel and improved box forming machine, the operation of which may be correlated to the operation of associated packaging equipment;

(7) To provide a novel and improved box forming machine in which all operating components are intercoupled to assure proper sequencing in the overall functioning of the machine.

Additional objects of my invention will be brought out in the following description of the same in its preferred form, taken in conjunction with the following drawings, wherein:

FIG. 3 is an enlarged view in elevation along the lines of that of FIG. 1, but with the storage and feeder means removed;

FIG. 3A is an enlarged view depicting a detail of FIG. 3;

FIG. 4 is a plan view of that portion of the machine depicted in FIG. 3;

FIG. 5 is a horizontal view depicting operating components of the machine as viewed from underneath;

FIG. 6 is a view in section taken in the plane 6—6 of FIG. 4;

FIG. 8 is a detail view in section through a suction cup assembly involved in the box forming components of FIG. 7;

FIG. 9 is a detail view looking into the suction cup of FIG. 8;

FIGS. 16 and 17 are views depicting features in the structure of feeder means and associated cooperating storage means from which the machine is supplied;

Figure 2:
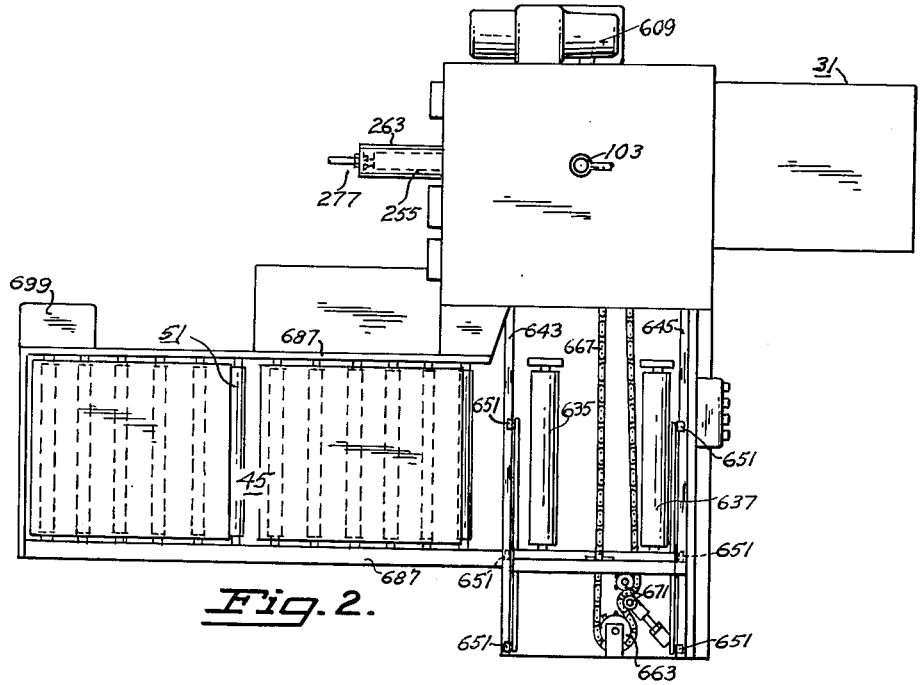
FIG. 2 is a plan view of the machine of FIG. 1.
Figure 1:
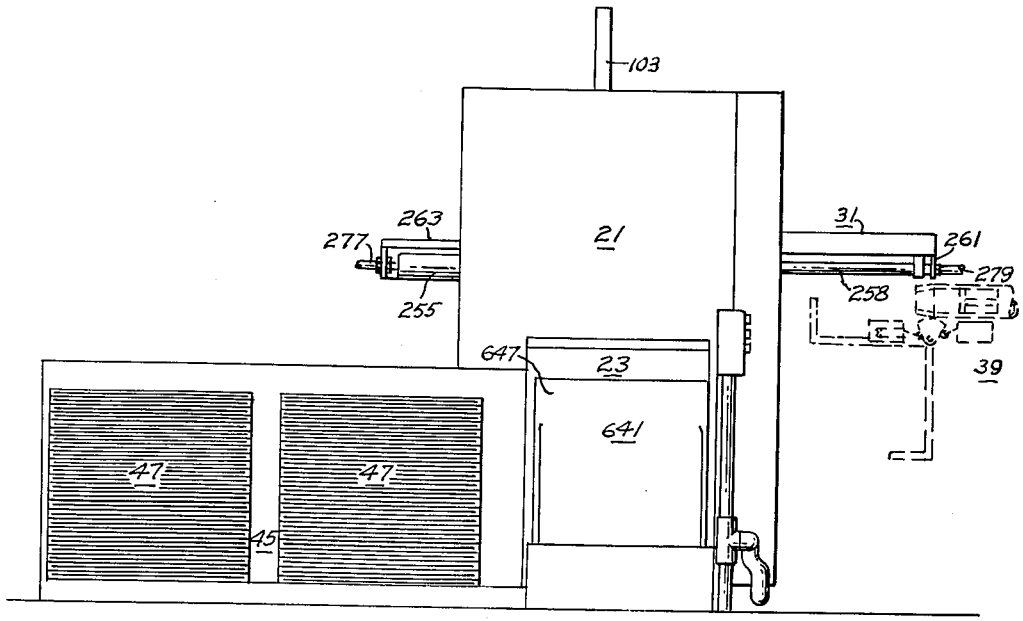
FIG. 1 is a side view in elevation of the machine of the present invention.
Figure 7:
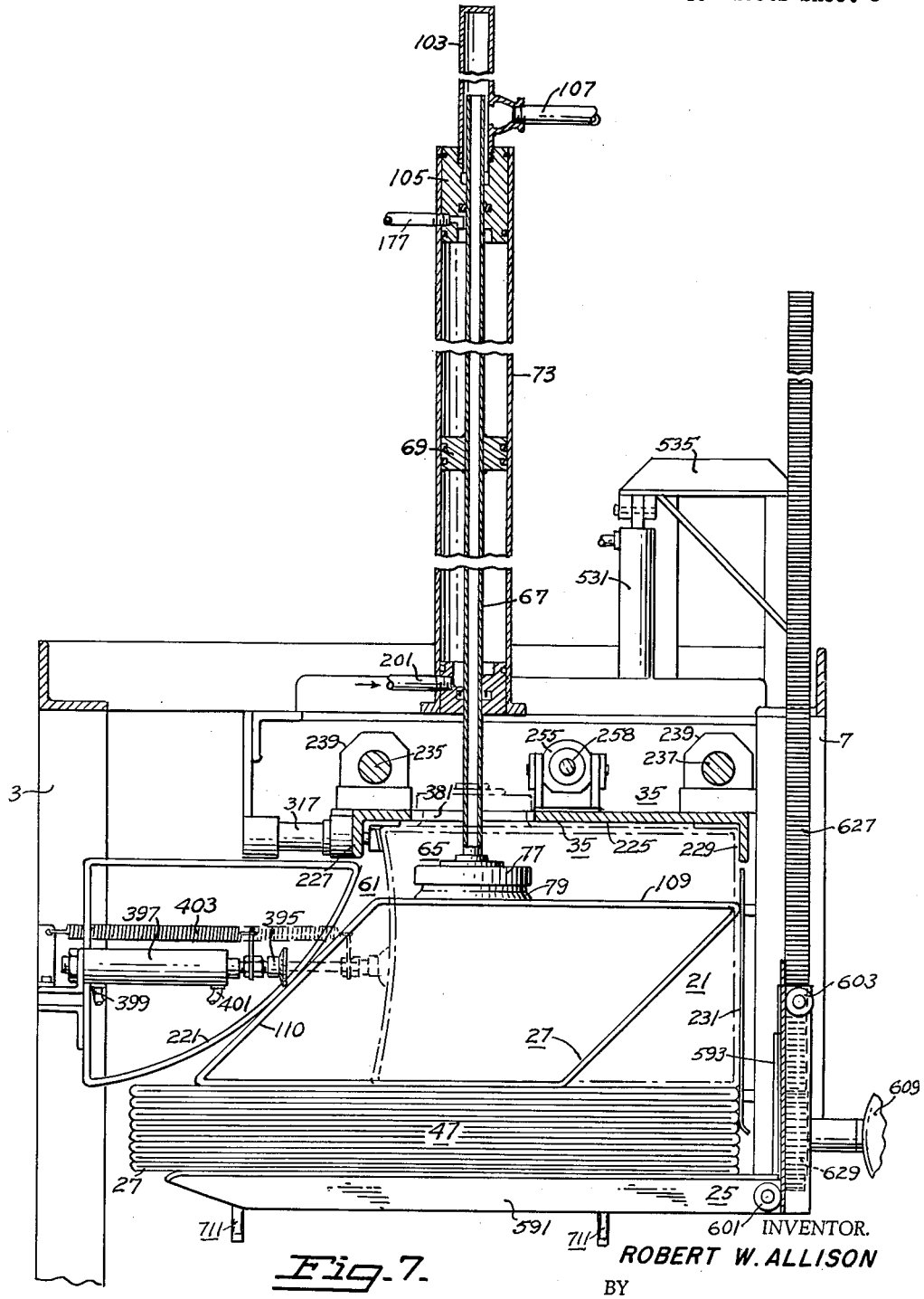
FIG. 7 is a view, partly in section, depicting box forming components of the machine of FIG. 1.
Figure 10:
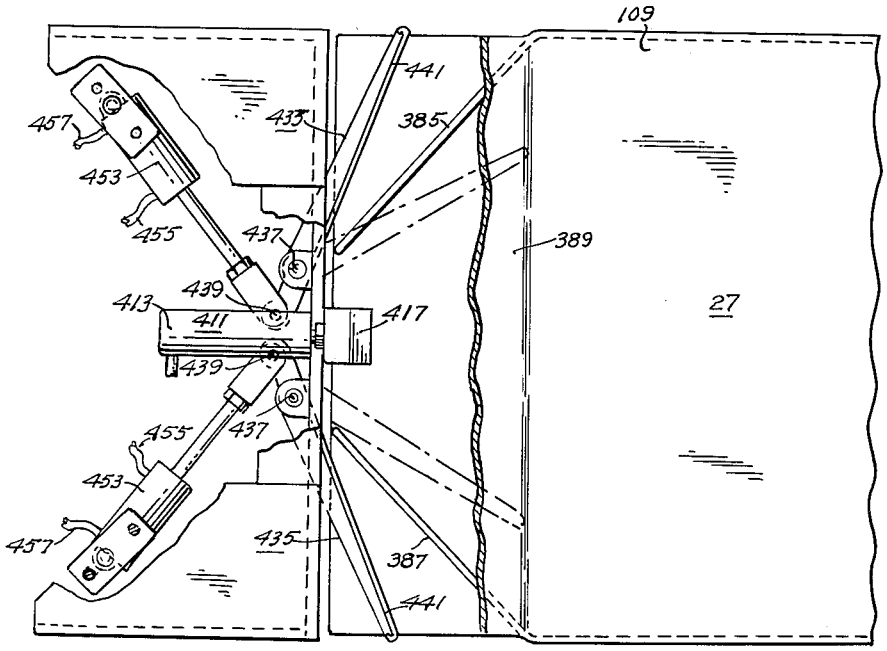
FIG. 10 is an enlarged view of a flap closing assembly involved in the setting up or forming of a box.

FIGS. 19 through 22 together constitute a combined electrical, hydraulic and pneumatic circuit diagram involved in controlling the operation of the machine of FIG. 1.

Referring to the drawings for details of my invention in its preferred form, the same comprises a main frame 1 of angle iron forming the outline of a vertically disposed parallelepiped, said frame including vertical corner members 3, 5, 7 and 9 connected at intermediate elevational levels by horizontal connecting members to roughly define an upper or box forming section 21 and a larger lower section 23 to be occupied by means 25 for elevating to the box forming section, boxes 27 in their collapsed condition, to be formed.

Suitable angle iron frame work 31 extending from the upper end of the framework to the right as viewed in FIG. 3 and 4, forms a cantilever support for a travelling carriage assembly 35 which will transfer from the forming section 21 to an adjacent packing machine 39, each box 27 as formed.

Directly in front of the main framework is a substantially rectangular storage and feeder area 45 extending from the right side of the main framework to left thereof, preferably a distance substantially equal to space required for three stacks 47 of unfolded boxes; that portion of the area in line with the elevator section 23 of the main frame, being the feeder portion. Conveyor means 51 covering this area, provides for movement of such stacks from the storage area to the feeder area and from there to the elevating means 25, all in properly timed sequence as determined by involved control systems to be described.

On the elevating means, the stack is moved upward to the box forming section 21 where each box in turn, as formed, is conveyed out of the machine by the carriage assembly 35 as previously indicated.

The entire operation of the machine is sequence controlled throughout and the control circuits are designed to permit automatic operation only if all the foregoing sequences have been normal, and if proper conditions exist for the performance of the next step in the operating cycle of the machine. This normalcy is indicated by sensing means located throughout the framework.

The foregoing affords a broad general description of the machine and its operation. Further reference will be made to the drawings for additional details and features involved.

The heart of the machine is a box forming assembly 61 which is located in the box forming section 21 of the main frame and includes a suction cup 65 at the lower end of a hollow piston rod 67 extending through and affixed to a piston 69, this piston being slidably disposed in a double acting cylinder 73 vertically supported in the upper end of the frame.

The suction cup 65 includes a horizontally disposed downwardly flanged circular face plate 77 axially mounted on the end of the hollow shaft 67 and having a central opening therethrough in registry with the hollow shaft. Anchored to the face plate flange is a downward extending flexible lip 79 of rubber or the like.

Disposed against the under surface of the plate 77 is a spiral spacer 83 of wire against which is maintained a sandwich air filter 89 involving two circular perforated disks 91, 93 with a layer 95 of felt inserted between, such filter being held in place by a snap ring 97. A collar 99 of lesser diameter than the filter and coaxially affixed to the bottom disk 93 terminates within the cup to form a stop which prevents the wall of a box from being drawn into the cup and unduly distorted or damaged when engaged by the cup.

The hollow suction cup shaft 67 extends upward through the upper end of the cylinder 73, and terminates with its open end in an enclosing cylinder 103 coaxially mounted in a plug 105 closing the end of the cylinder about the hollow shaft in a sliding fit provided by suitable seals and O-rings surrounding the hollow shaft. The length of said enclosing cylinder 103, when sufficient to permit required vertical movement of the suction cup, will make it possible to effect withdrawal of air from within the suction cup for the entire stroke of the piston 69, by way of a vacuum hose connection 107 to such enclosing cylinder.

The vacuum lift cylinder is so located as to position the suction cup above what might be considered the front wall 109 of a box to be formed, thus leaving to one side of the front wall, an exposed side wall 110 of such box.

Figure 20:
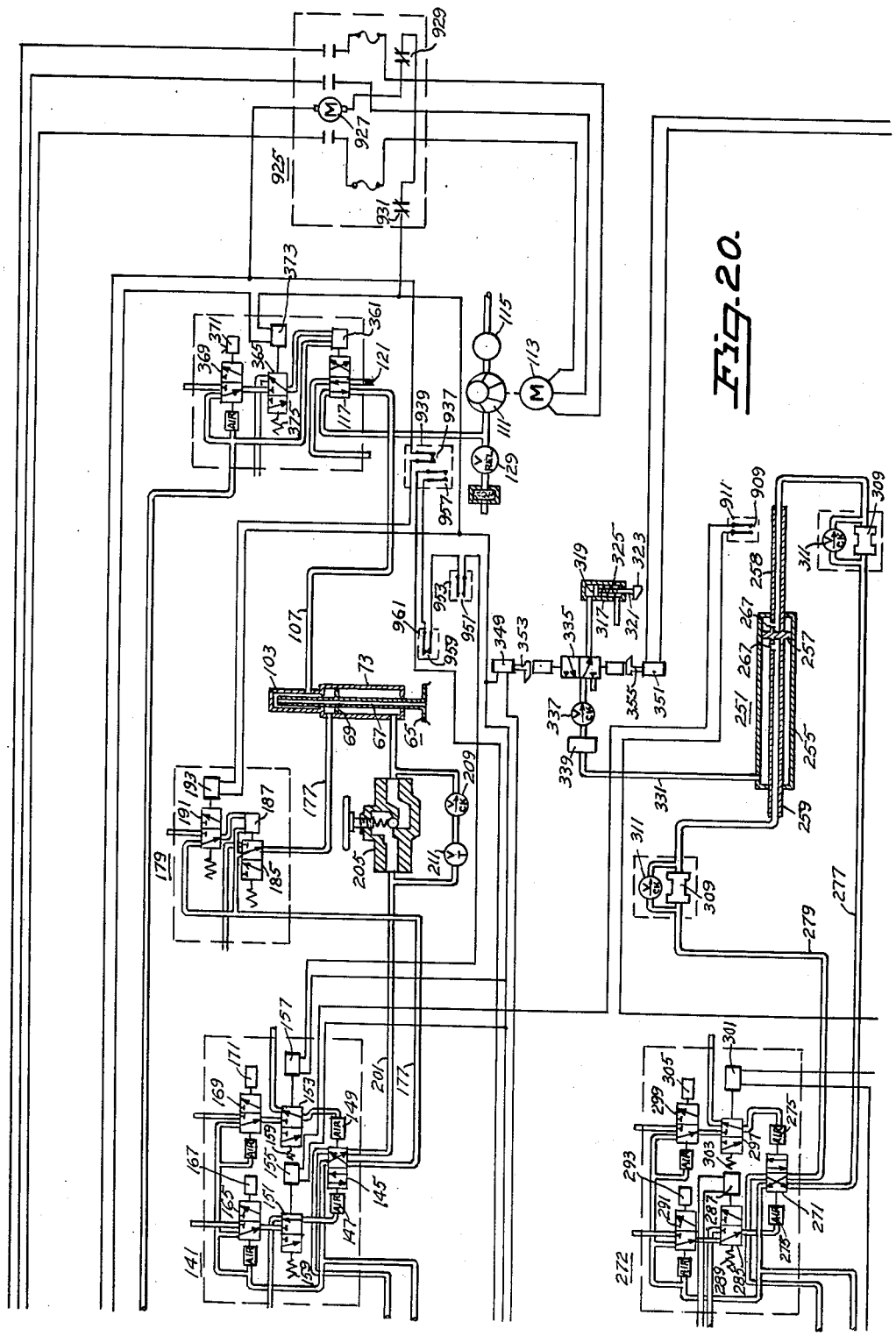
Figure 21:
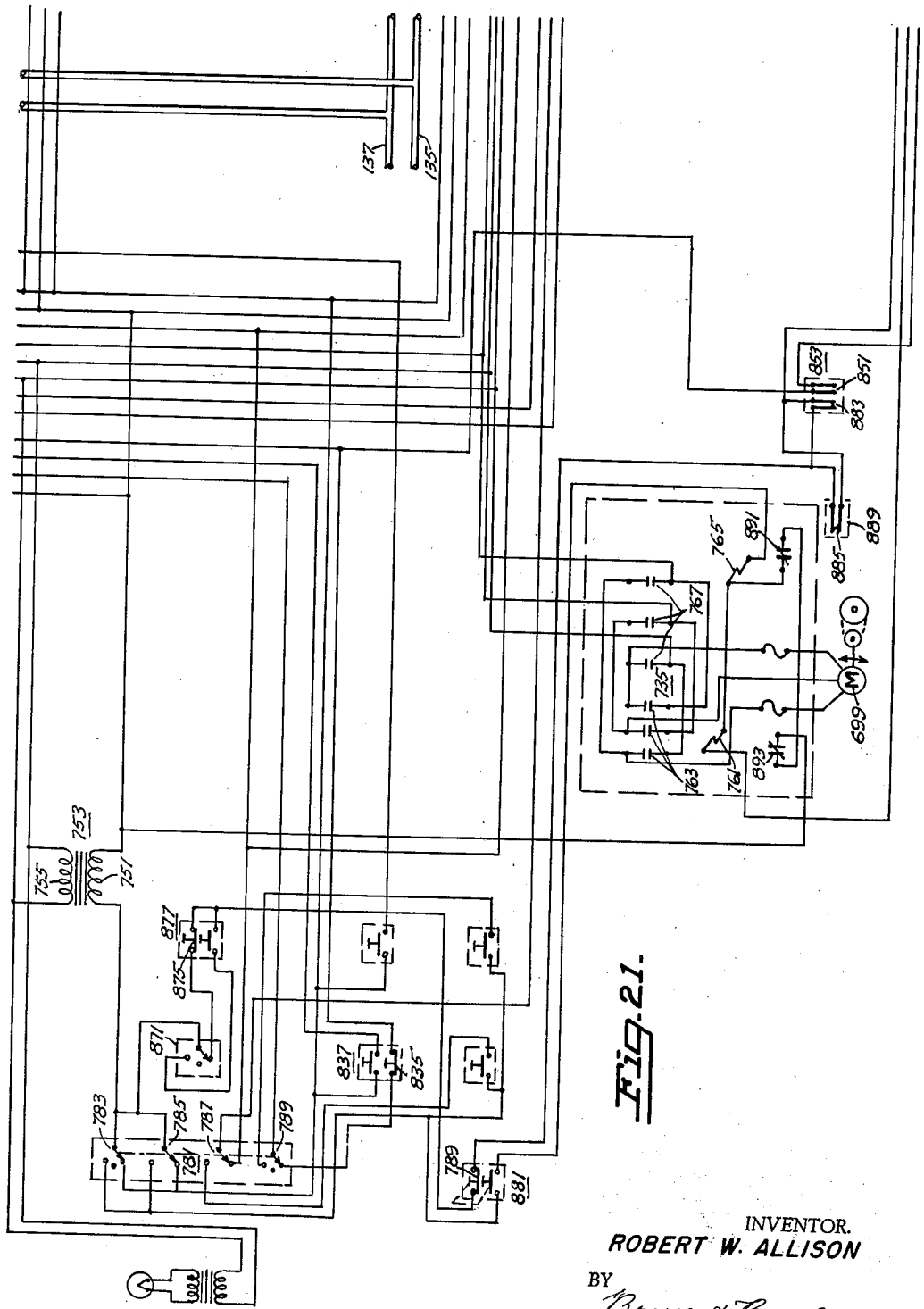

Referring to FIG. 20, the vacuum system of which the hose connection 107 is a component, includes a vacuum pump 111 driven by an electric motor 113, the pump having its discharge end connected to an exhaust muffler and oil trap 115, and its intake end connected to a two position vacuum control valve 117 (FIG. 20). This valve normally occupies a position which terminates the intake end of the pump in a plug 121 which keeps the vacuum load on the pump at all times. The valve when shifted to its other position, connects the vacuum pump to the vacuum lift cup 65 by way of the hose connection 107, for the pickup of boxes from a stack 47 in the forming of such boxes.

As a protection against development of abnormal operating conditions, a spring loaded relief valve 129, is connected into the line to the intake end of the pump, such valve also being adjustable to determine maximum degree of vacuum established by the pump during operation of the machine.

Referring to FIGS. 19–22, the double acting cylinder 73 associated with the lift cup 65 is supplied with air from a compressed air system involving a source of air pressure (not shown), connected to an air manifold 135 and discharging through an exhaust manifold 137 and its operation is controlled through a multiple valve arrangement 141.

Such multiple valve arrangement includes a vacuum lift cylinder valve 145 capable of controlling the direction of movement of the vacuum lift cup 65 by reversing the air and exhaust manifold connections to the top and bottom chambers of the associated cylinder. Said valve is a two position, air operated valve with its position determined by energization of one of two associated air cylinders 147, 149, these in turn each being coupled through a two position solenoid operated valve 151, 153 respectively capable of being actuated out of normal position by a solenoid 155, 157 respectively against the action of a spring 159.

In the normal position of either solenoid operated valve, the associated air cylinder of the vacuum lift valve 145 is blocked off.

Upon energization of solenoid 155 of valve 151, the associated air cylinder 147 is connected through said valve to the air supply manifold 135 by way of a two position self-energized air operated valve 165, such valve including a manual shift 167 adapted to interrupt the flow connection through the valve and exhaust the air cylinder 147 to atmosphere.

Similarly, the other air cylinder 149 of the vacuum lift valve, may be controlled through the solenoid operated valve 153 and a self-energized air operated valve 169, also provided with a manual shift 171.

The manual shift controls 167 and 171 permit manual control of the valve 145 if and when desired.

From the first output port of the vacuum lift valve, a flow line 177 extends to and enters the lift cylinder at a point above the piston. Included in this line is a control valve assembly 179 comprising a two position valve 185 operated by pressure differential cylinder 187 against the action of a spring 189, and adapted to switch the upper chamber of the vacuum lift cylinder between air supply and air exhaust.

Timing of the operation of this valve 185 is controlled through an associated two position, solenoid operated valve 191 having a solenoid 193 which in its energized condition, permits the valve 185 to be in its normal condition, in which condition, air under pressure will be supplied to the upper end of the vacuum lift cylinder.

Upon de-energization of the solenoid 193, a pressure differential will develop in the pressure differential cylinder, sufficient to overcome the associated spring 189 and thereby switch the upper end of the vacuum lift cylinder from air supply to exhaust.

From a point in the lift cylinder 73 below the piston 69, a line 201 leads to the second output port of the vacuum lift valve 145. Included in the line 201 is a "rebound" valve 205. This valve is preferably in the form of a hand adjustable spring loaded ball valve which will allow air above a preset pressure (slightly above atmospheric) to escape from the bottom of the lift cylinder to the exhaust manifold through the vacuum lift valve 145 when it is properly positioned. Thus the air pressure in the bottom of the cylinder during downward stroke of the piston cannot decrease below the preset pressure of the "rebound" valve and accordingly must be above atmospheric pressure. Upon removing the air supply from the upper end of the cylinder and exposing this end to the atmosphere, the piston will rebound to a position of balance between the suction lift and the weight supported thereby. Such rebound is utilized to great advantage in separating the uppermost box from a stack.

In this connection, the rebound action serves the dual purpose of (1) breaking the top box in a stack, away from the others to assure lifting but one box at a time, and (2) breaking the vacuum between the contacting surfaces of the folded box to facilitate the forming thereof.

Shunting the "rebound" valve 205 are a check valve 209 in series with a restrictive rise control valve 211, these valves permitting flow of air through line 201 to the lower end of the vacuum lift cylinder, when lifting is to be performed.

The line 201 thus completes the air circuit to and from the vacuum lift cylinder. Upon energizing both the solenoid 155 and the solenoid 193, the upper end of the vacuum lift cylinder will be connected to the air supply manifold, and the lower end to the exhaust manifold to initiate a down stroke of the vacuum cup.

Upon energization of the solenoid 157, to the exclusion of the solenoid 155, and with the solenoid 193 de-energized, the air line connections from the air supply manifold and the exhaust manifold to the vacuum lift cylinder will be reversed and the vacuum cup 65 will be lifted. Thus, the solenoid 155 may be termed the "down" solenoid whereas the solenoid 157 may be designated the "up" solenoid.

Suitably affixed to a cross member of the main frame and disposed above the exposed side wall 110 of the uppermost box of the stack being worked, are two parallel spaced forming bars 221 comprised each of a flat strip of steel bent so as to include an arc of approximately 90° extending inwardly and upwardly over the exposed side wall 110 of the topmost box. An upward lift on the unformed box by the vacuum lift cup will cause the forming bars to be engaged by the side wall 110 of the box whereby the box will be compelled to substantially square itself.

The carriage assembly 35 includes a carriage formed of a plate 225 with opposing downwardly directed flanges 227 and 229 spaced sufficiently apart to loosely receive a box in its formed condition and with the front wall 109 of the box facing into the carriage, the flange 229 being in line with a guide frame 231.

Suspended beneath the cantilever framework 31 and running from the end thereof to the upright members 3 and 7 of the main frame, are a pair of ways 235 and 237 from which are suspended the carriage, by means of bearing blocks 239 attached to the upper side of the carriage plate 225 at the four corners thereof.

Also mounted on top of the carriage plate, midway between the ways and parallel thereto, is a carriage travel cylinder assembly 251, involving a double acting cylinder 255 slidably mounted on a stationary piston 257 (FIG. 20) from which stationary hollow shafts 258, 259 extend in the opposite directions, the shaft 258 being supported at its free end from the cantilever frame 31 by a bracket 261 while the other shaft 259 is supported at its free end by a bracket 263 extending out from the remote side of the main frame. By providing an opening 267 in each of the hollow shafts 258 and 259 adjacent the piston 257, air under pressure may be admitted to either side of the piston to effect movement of the cylinder in either direction, and switching between air supply and air exhaust to effect such manner of operation is under control of a two position air operated valve 271 similar to the vacuum lift cylinder valve 145, and forming part of a valve arrangement 272. Like valve 145, the valve 271 includes air cylinders 273, 275. An air line 277 connects the free exposed end of hollow shaft 258 to one port of the valve 271, while an air line 279 connects the free exposed end of the other shaft 259 to a second port in valve 271.

The air cylinder 273, like corresponding air cylinder 147 of the suction lift cylinder valve 145, is supplied through a two position solenoid operated valve 285 capable of being actuated out of normal position by a solenoid 287 against action of a spring 289, and by way of a self-energized air operated valve 291 provided with a manual control 293.

Similarly, the air cylinder 275 is supplied with air through a two position solenoid operated valve 297 and a self-energized air operated valve 299, the valve 297 including a solenoid 301 and opposing spring 303, and the air operated valve 299 including a manual shift 305.

Thus, with the solenoid 287 energized and the solenoid 301 de-energized, air will be supplied under pressure from the air supply manifold 135 through valve 271 and the line 279, to the exposed end of hollow shaft 259 and into the carriage transfer cylinder 255 to drive the cylinder to the left as viewed in FIG. 20 of the drawings, which could represent travel in the inboard direction in the machine.

By energizing the solenoid 301 to the exclusion of solenoid 287, the flow into and out of the cylinder 255 will be reversed, thus causing reverse travel of the cylinder in the outboard direction.

In each of air lines 277 and 279 is an adjustable flow restriction valve 309 by-passed by a check valve 311, the restriction valve functioning in the outflow direction and the check valve in the inflow direction.

Each box, as lifted up into the carriage during forming, is releasably gripped to support the same in the carriage, independently of the suction cup lifting means, to permit subsequent de-vacuumizing of the suction cup while retaining the box in the carriage.

The gripper means includes a gripper cylinder 317 affixed at one end to one of the carriage flanges 227 and containing a piston 319 and associated plunger rod 321 extending through a hole in the flange and terminating in a rubber surfaced wedge shaped plunger head 323 between the flange and the proximate side 110 of the box. A spring 325 within the cylinder 317 about the plunger rod, normally biases the piston into the cylinder to hold the plunger head out of engagement by the box side 110 during forming of the box.

By supplying air under pressure into the gripper cylinder behind the piston, following arrival of the box into the carriage during the forming procedure, the plunger 323 may be driven with sufficient force into the side of the box, adjacent the upwardly facing front wall 109 thereof, to simultaneously bow in the engaged side wall 110 and force the opposing side wall into pressure engagement with the proximate flange 229 of the carriage. This causes the box to be firmly gripped, and in a manner which permits it to be readily released by merely withdrawal of the plunger, whereupon gravity will cause it to fall.

The air supply to the gripper cylinder 319 is derived through an air line 331 from the inboard end of the carriage transfer cylinder 255, said line including a two position valve 335 adapted in one position to convey air to the gripper cylinder to actuate the gripper plunger, and in its other position to block the air line 331 and exhaust the same end of the gripper cylinder to atmosphere.

A check valve 337 in the line 331 prevents reverse flow, and a filter 339 blocks movement of foreign matter into the valve.

The two position valve 335 is selectively actuable by independent solenoids 349, 351, each adapted through an associated plunger 353, 355 respectively, to shift the valve in a direction opposite to the other. The independency of the solenoids, permits the valve to be mounted on the carriage for travel therewith, while the solenoids can be mounted on the main frame in position to actuate the valve at some predetermined positions of the carriage. Thus, one solenoid 351 may be located at the inboard position of the valve 335 to effect operation of the gripper mechanism, while the other solenoid 349 will be located at the outboard position of the valve, to de-energize the gripper mechanism and permit release of a formed box when it reaches its discharge point at the extremity of the cantilever frame 31.

This manner of gripping and releasing a box in controlling its movement from the box forming section of the main frame to its outboard position of discharge avoids the need of flexing air line connections conventionally employed in such operations, and thus eliminates what would constitute a potential source of trouble in the operation of a machine.

Before the carriage can begin transfer of the box from the machine, the box must be effectively released from the suction lift mechanism which has lifted it into the carriage. The suction hold of the cup on the box may be broken by shifting of the two position valve 117 as previously indicated. This valve is controlled through a pressure differential cylinder 361 fed at one end directly from the air supply manifold, and at its other end through a two position valve 365 and a self-energized two position valve 369 provided with a manual control 371.

The two position valve 365 includues an operating solenoid 373 acting against a normal position determining spring 375. Thus with the solenoid 373 de-energized, the vacuum pump 111 will be connected to the vacuum lift cylinder 73, but with the solenoid 373 energized, the two position valve 117 will be caused to shift and block the vacuum pump intake while exhausting the vacuum lift cylinder to the atmosphere, thereby releasing a box from the grasp of the suction cup.

To avoid physical interference by the lift mechanism to free travel of the carriage, the carriage plate 225 is provided with a notch 381 in the inboard edge thereof, through which the suction lift mechanism can function.

Prior to delivering the box from the machine, and as part of the box forming operations, the two side flaps 385, 387 and the upper flap 389 which cooperate in the forming of the bottom of a box, are folded inwardly and the box is delivered in this condition.

As a preparatory step in this direction, the box at this stage is squared up by a plunger 395 operating out of a cylinder 397 having an air line 399 at one end and an air line connection 401 at its other end, the plunger being normally biased into the cylinder by a spring 403. The squaring cylinder is mounted on the main frame, preferably between the forming bars 221 and in position for its plunger, when actuated to strike the proximate side wall 110 of the box which will cause the box to square itself.

As a further preparatory step, the upper flap 389 and the lower opposite flap 407 are spread wide so as not to interfere with the contemplated inward folding of the side flaps 385 and 387.

Figure 11:
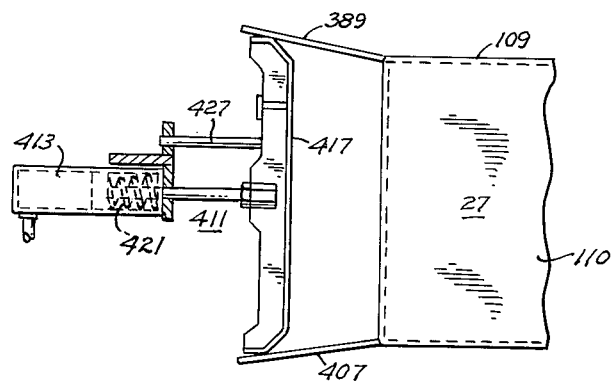
FIG. 11 is an enlarged view depicting a flap spreader assembly which cooperates with the flap closing assembly of FIG. 10 in setting up or forming of a box.
Figure 12:
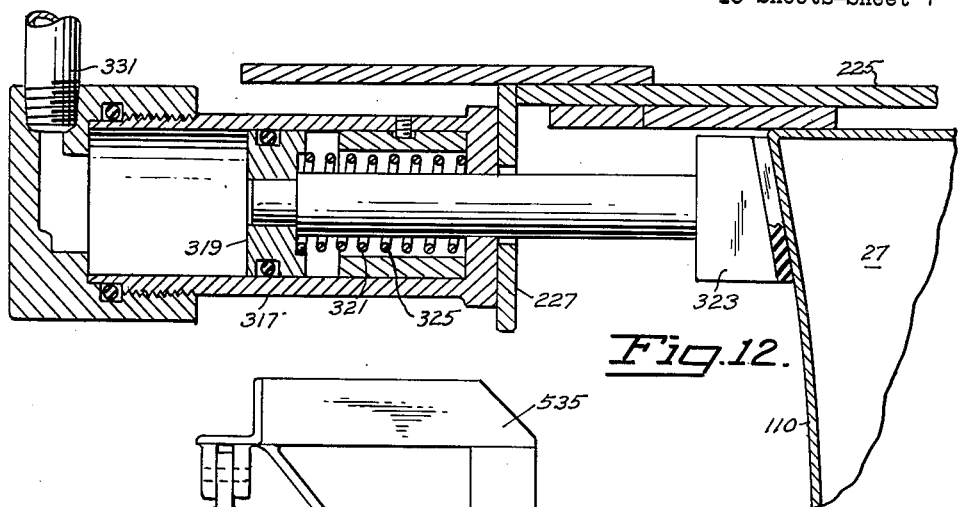
FIG. 12 is an enlarged view of gripper means built into a carriage assembly showing up in FIG. 5 and 6.

This is accomplished by a spreader assembly 411 (FIG. 11) including a spreader cylinder 413 and included plunger terminating in a spreader bar 417 which is angled at each end to facilitate insertion between the flaps to be spread.

An internal spring 421 normally holds the spreader bar in retracted position, while an air line connection 423 to one end of the spreader cylinder and a second line connection 425 to the other end provide for driving the spreader forward against the action of the spring 421.

The spreader cylinder is supported on the main frame with the spreader bar facing into the proximate end of the box being formed. Upon being projected forward, the spreader bar will engage the upper and lower flaps 389, 407 and spread them apart.

A pin 427 from the spreader bar and entering a guide hole in the supporting structure, serves to hold the spreader bar in its desired vertical position.

With the box squared up and the upper and lower flaps spread apart, conditions are ripe for folding in of the side flaps 385, 387. For this purpose, I provide a pair of levers 433, 435, each pivotally mounted in the vicinity of one of the side flaps, at an intermediate point 437, for swinging in a horizontal plane, the pivot point being in proximity to a control end 439, leaving a longer arm 441 for engaging and folding in of the proximate side flap.

Each fold-in lever is operatively connected at its control end to the rod of a piston 451 slidably contained in a double acting air cylinder 453 having an air line 455 connecting to one end and an air line 457 connecting to the other end.

The air supply to the squaring cylinder 397, the flap spreader cylinder 413 and the two side flap folding in cylinders 451, 453 is derived from the air manifold 135 through the valve arrangement 457, and the same cylinders exhaust through the valve arrangement 457 to the exhaust manifold 137, the valve arrangement 457 being similar to the valve arrangement 272 associated with the operation of the carriage transfer cylinder 255 and the like arrangement described in controlling the operation of the vacuum lift mechanism.

The valve arrangement 457, like the others, involves a two position air operated valve 461, whose function is to interchange or switch a pair of air lines 463 and 465 leading from the air supply manifold and the air exhaust manifold and to which the squaring cylinder, the flap spreading cylinder and the side flap folding in cylinders are to be connected.

This two position valve 461 includes a pair of air cylinders 469, 471, the one 469 being energized from the air supply manifold through a solenoid operated valve 475 and a self-energized two position valve 477, the solenoid operated valve including a solenoid 481 acting against a spring 483, while the valve 477 includes a manual control 485.

Similarly, the air cylinder 471 is energized through a two position valve 491 controlled by a solenoid 493 and opposing spring 495, and a two position self energized valve 499 having a manual control 501.

The manual control when actuated, or the solenoid when de-energized, is in each case, adapted to cut off air pressure to its associated air cylinder and thus prepare for a shift of the air lines switching valve 461.

Squaring cylinder 397 and flap spreader cylinder 413 have their corresponding air line connections 399 and 423 connected in parallel to the air line 463 through one port of a two position valve 511, while the corresponding air line connections 401 and 425 are connected in parallel to the atmosphere through a second port of the same two position valve 511, this valve being controlled by a solenoid 513 operating against a pressure differential cylinder 515. With the solenoid 513 de-energized, the valve 511 will be in position to permit air supply to the drive end of each of said cylinders and cause forward thrusting of their respective plungers. With the solenoid 513 energized, the valve will shift to connect the drive end of each cylinder to the exhaust manifold and permit rapid retraction of the plungers by the associated spring, aided by air pressure, now being supplied to the spring end of each cylinder.

Side flap folding-in cylinders 453 are connected in parallel to the air lines 463, 465, with the air line connections 455 connecting to the air line 463 through a two position side flap control valve 521 which includes a pilot 523 and solenoid 525 in the operation thereof. In its normal position, that is with the solenoid not energized, and with the air lines switching valve 461 in position to connect line 463 to the air supply manifold, the remote ends of the cylinders will be connected to exhaust while air, with valve 521 properly positioned, will be supplied to the opposite ends of the cylinders to drive the pistons inwardly of their cylinders and pull in on fold-in levers 433 and 435 to cause them to swing inwardly and fold in the side flaps of a box. But valve 521 is in its normal blocking position and nothing can happen until its solenoid 525 is energized.

With the side flaps 385, 387 folded in, the box is ready for folding in of the upper flaps 389. For this purpose, I provide a double acting cylinder 531 and associated plunger 533, the cylinder being suspended from a bracket 535 above the position of the upper flap 389, and the plunger being stabilized by a stabilizing rod 537 pivotally connected at one end to the plunger and at its other end to a suitable point on the frame.

Figure 15:
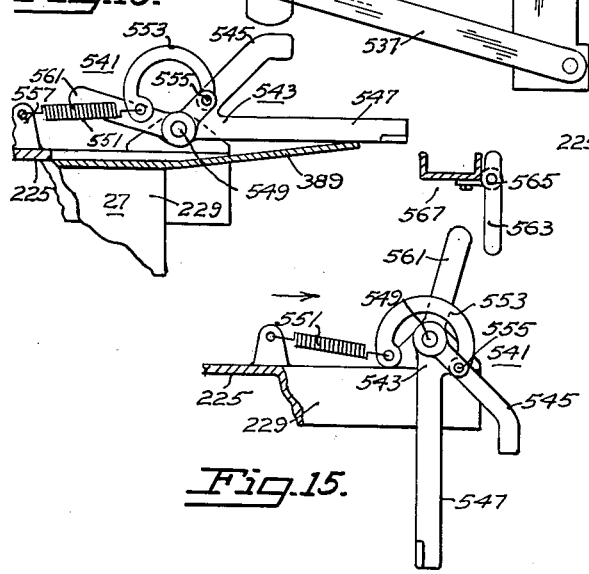
FIGS. 14 and 15 are views depicting the latch mechanism of FIG. 13 in two different positions of operation.

Mounted on the carriage plate 225 at the inboard edge thereof, and between the plunger 533 and the upper flap 389, is a toggle latch assembly 541 (FIGS. 13, 14, 15) whose function is to fold in and hold the upper flap in its fold in position, in response to a blow from the plunger above.

Figure 13:
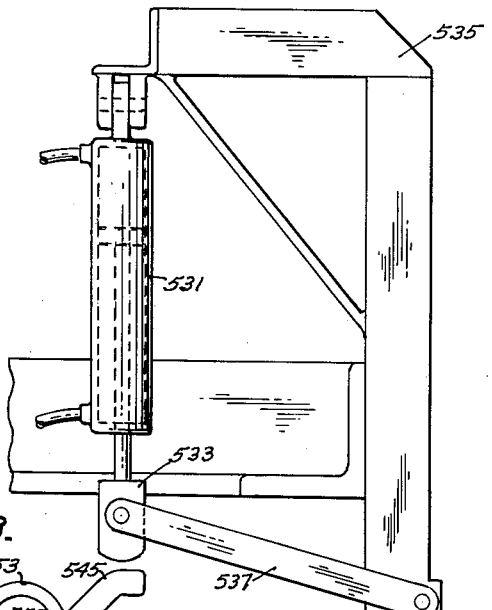
FIG. 13 is a view illustrating mechanism for closing and latching an upper flap in a box end, preparatory to delivering the formed box out of the machine.
Figure 14:
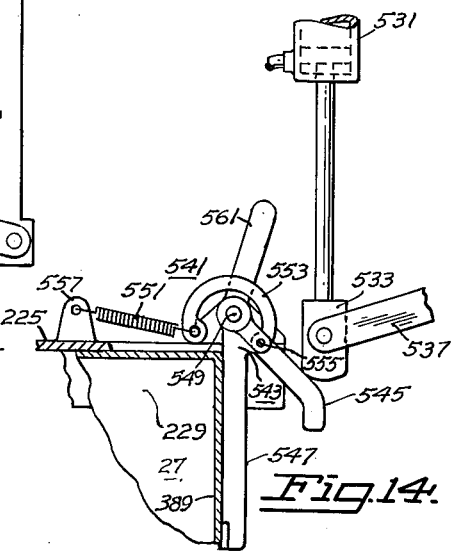
Figure 18:
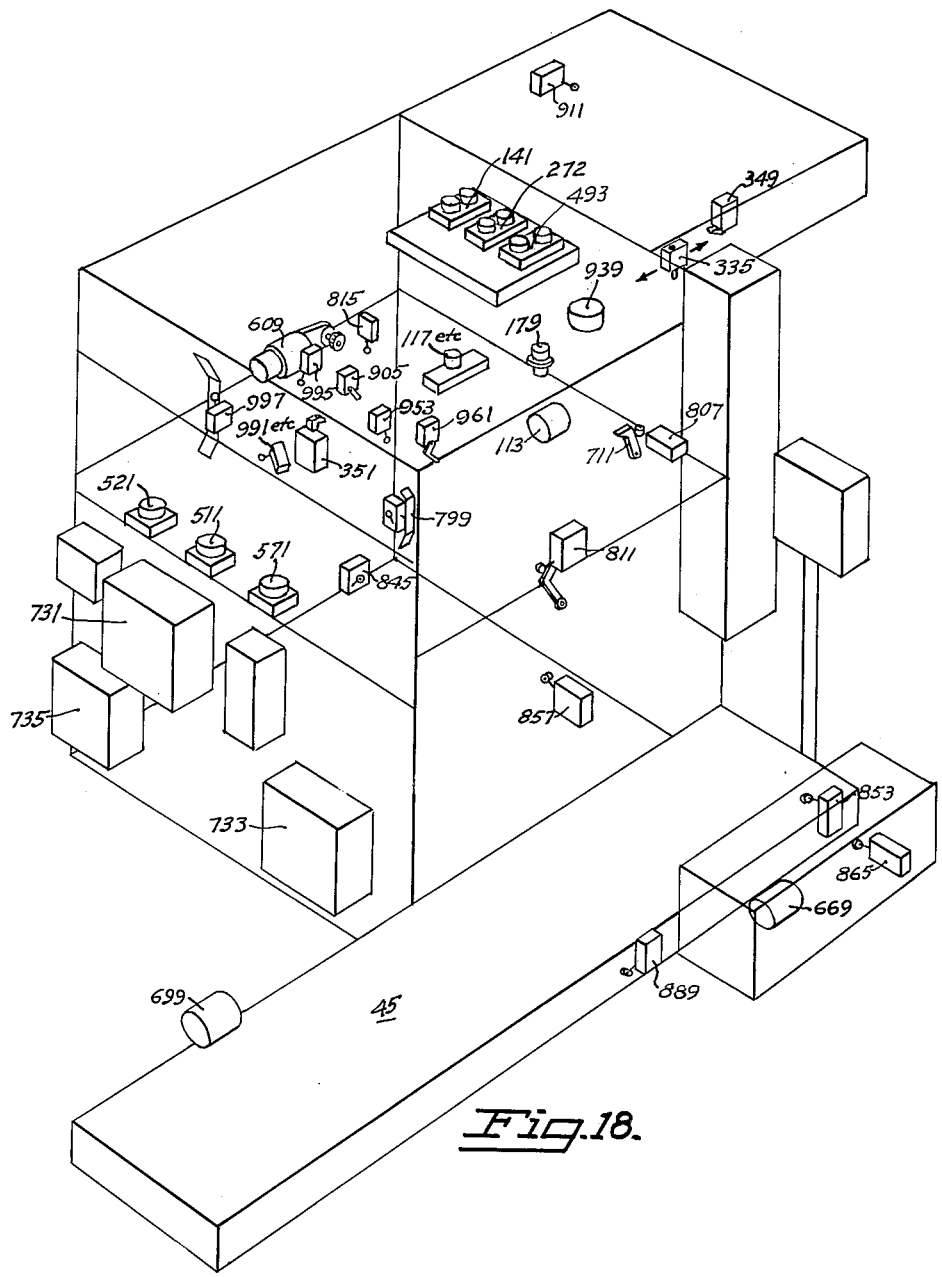
FIG. 18 is a three dimensional view depicting the locations of various electrical hydraulic and pneumatic control components involved in the operation of the machine of FIG. 1.
Figure 19:
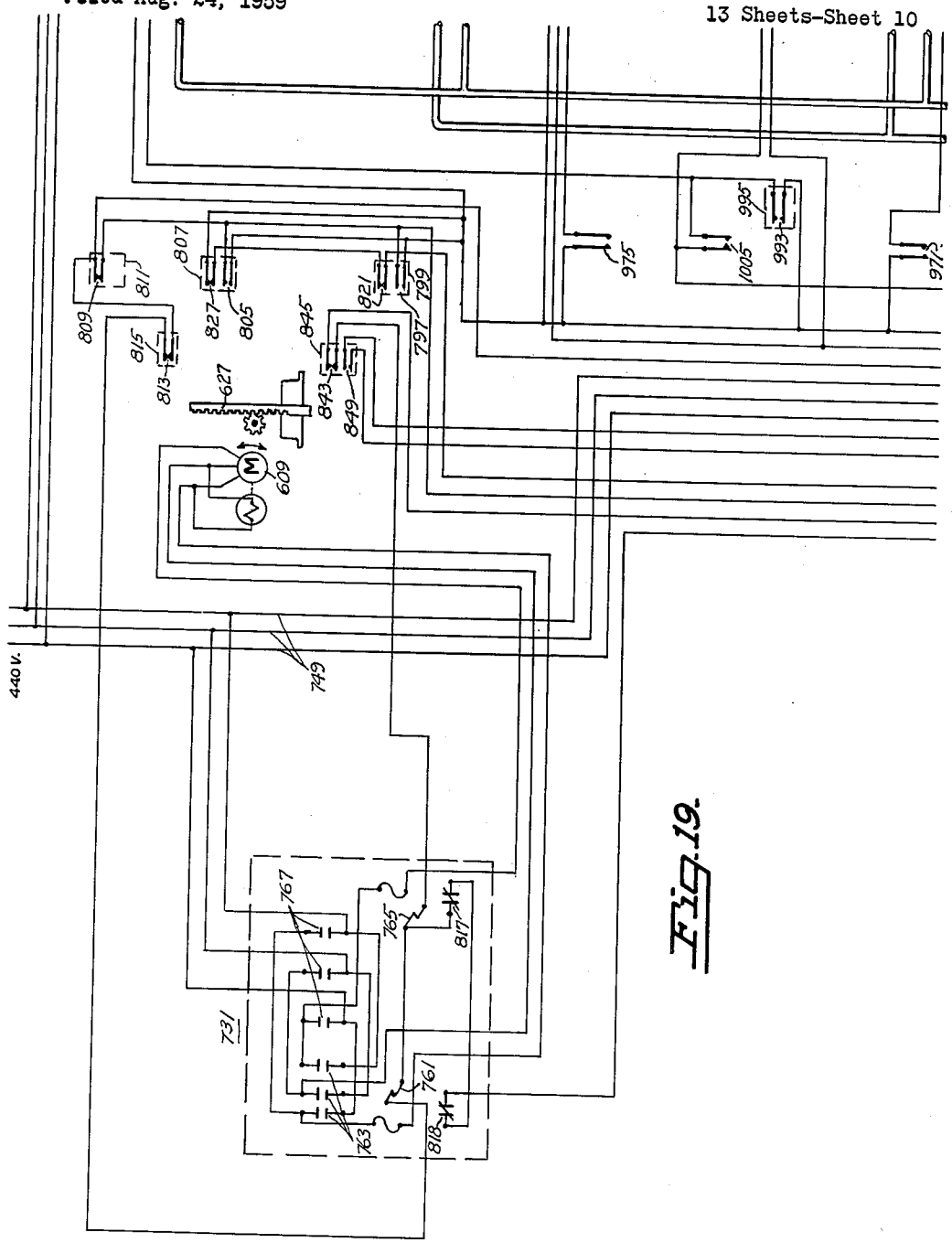

This latch assembly includes a bell crank lever 543 having angularly related arms 545 and 547 pivotally mounted on a horizontal shaft 549, the bell crank lever being adapted to occupy either of two stable positions, by a toggle spring 551 and arcuate link 553 connecting between an intermediate point 555 on the lever arm 545 and a fixed point 557 on the carriage. In one such stable position, the lever arm 545 will be disposed in line with the plunger 533 above, with the other arm substantially horizontally poised above the upper flap as illustrated in FIG. 13. In its other stable position, the bell crank lever will have been rotated by the plunger, to fold in the upper flap and retain it in such position, as depicted in FIG. 14. With the upper flap thus latched, the box is ready to be transported out of the machine by the carriage.

Upon return of the carriage to the box forming section of the machine, resetting of the toggle assembly must be effected. For this purpose, I provide a reset arm 561 fixed to the shaft 549 and extending upwardly in line with a one way trip finger 563 pivotally suspended at an intermediate point on a horizontal pin 565 but blocked from swinging in the inboard direction by a beam 567 disposed adjacent the upper portion of the finger and blocking swing of the finger in the one direction. Thus in transporting a box out of the machine, the finger when struck by the reset arm 561 will give and allow continued movement of the carriage without resetting the toggle latch. On the return of the carriage, however, the trip finger will act as a rigid member with no give, and consequently will force the reset arm to a position freeing the latching assembly from its latching position and restoring it to its unlatching position.

Actuation of the latching assembly is thus instigated by the cylinder 531 and its plunger 533, the cylinder being connected at each end to one of the air lines 463 and 465. In the connection to the drive end of the cylinder, is a two position valve 571 actuable from a normal position connecting atmosphere to the drive end, to a position permitting air under pressure to the drive end. The shift from its normal position is under control of a solenoid 575 in cooperation with an associated pilot valve 577.

A feature of the present machine resides in the manner of continually presenting boxes in their collapsed condition to the forming mechanism, and this involves the elevating means 25, and the apparatus for moving stacks of boxes from the storage area to the feeder section and from there to the elevating means.

The elevating means 25 comprises a fork type lift including a horizontal lift fork 591 of slightly less width than the boxes to be lifted thereon, said lift fork being provided with a back frame 593 adapted to ride a pair of vertical disposed angle iron rails 595, 597, by fitting the back frame with a pair of vertically spaced rollers 601, 603, for each rail, the lower roller 601 in each case, engaging the front surface of the proximate flange of the rail while the upper roller 603 engages the rear surface of the flange.

Power for operating the fork type lift may be derived from a motor 609 mounted on a bracket 611 affixed to the main frame of the machine in proximity to the back frame 593 of the lift. A vertical rack 627 affixed to the back frame is engaged by a drive pinion 629 on the motor shaft and driven thereby. In this manner, the lift fork may be elevated and lowered.

The elevating means is adapted to raise a stack of unformed boxes deposited thereon from the feeder section wherein is located feeder mechanism for the purpose.

Such feeder mechanism includes a pair of parallel spaced rollers 635, 637 in the feeder section directed toward the elevating means and journalled in suitable bearings 639. These rollers are adapted to support a stack of unformed boxes in position to be pushed longitudinally of the rollers and on to the lift fork 591, by a push frame 641 riding a pair of rails, 643, 645.

The push frame comprises a panel 647 supported in a vertical plane by brace rods 649 with track engaging rollers 651 adjacent the lower edge of the panel and the lower ends of the brace rods.

Travel of the push frame from a loading position to the position at which discharge of a stack onto the lift fork is completed, is accomplished by a chain drive 661 including a horizontal drive sprocket 663 at the front end of the feeder section, a horizontal driven sprocket 665 below the loading position of the lift fork, an endless sprocket chain 667 encircling said sprockets, and a drive motor 669 in drive connection with the drive sprocket. Adjustable tension means 671 maintains the chain under tension.

One side of the chain passes through a slit 675 in the lower edge of the push panel 647 at which point the chain is affixed, whereby the push frame will travel with the chain.

The feeder section rollers 635 and 637 represent the two end rollers in the conveyor means 51 occupying the storage area 45 and extending into the feeder section. This conveyor means, aside from the two rollers in the feeder section, includes a plurality of parallel carrier rollers 685 journaled in parallel frame members 687, each carrier roller carrying a sprocket 691 engaged by a drive chain 693. Idler sprockets 697 intermediate the roller sprockets 691 serve to maintain adequate drive engagement between the drive chain and the roller sprockets.

A motor 699 in drive conection with one of the sprockets through its associated roller, will drive all the rollers in the conveyor means. Thus a stack of unformed boxes in the storage area may, by operation of the conveyor means, be carried onto the rollers 635, 637 in the feed section, in position to be pushed onto the lift fork by the push frame.

By manually loading stacks in the storage area, adequate supply may be maintained to satisfy the requirements of the machine. However, to maintain continual production without interruption, unfolded boxes must always be presented to the forming mechanism, despite interruptions in smooth flow occasioned by return of the elevating means for a fresh stack of unformed boxes.

This problem I have solved by returning the lift fork for reloading with a fresh stack while there were still sufficient of the previous stack remaining to maintain productive output of the machine until the lift fork returns with its fresh load.

With this in mind, I pivotally mount on suitable frame supported brackets 707, a pair of dogs 711 on either side of the lift path of a stack on the lift fork, each dog involving a neck portion 713 topped by a head portion 715 directed inwardly toward the stack and biased toward such stack by a spring 717 above the pivot pin and bearing with one end against the fixed bracket 707 and its other end against the neck portion 713.

Movement of a stack upwardly between the dogs will spread them against the opposing force of their springs until the bottom of the stack passes, when the dogs, made possible by the narrower width of the lift fork, are free to move in beneath the stack, thereby enabling the stack to be supported by the dogs independently of the lift fork which is then free to return for a new load. Such shifting of the load from the lift fork to the dogs and beginning of the return of the lift fork to loading position, can be made to occur practically simultaneously by associating with at least one of the dogs, an electric switch 807 whose condition will change in response to such movement of the dog and connecting said switch in a suitable reversible circuit for the elevating means.

By locating the dogs at an elevation such that the number of boxes remaining in a stack when they take over, is sufficient to keep the machine productive until the lift fork can return with a fresh load, the operation and production of the machine may be maintained uninterrupted.

The functioning of the machine and the related timing of the operation of the various components thereof, are controlled by interconnecting electrical sequencing circuits. These are so laid out that all motors including the elevating means motor 609, the feeder motor 669, and the storage area conveyor motor 699 are each preferably controlled from a 3-phase 440 volt line through a 3-phase magnetic reversing controller 731, 733 and 735 respectively, while the rest of the circuits including the various solenoids, are energized from the low voltage winding 751 of a step-down transformer 753, whose primary winding 755 is connected across one phase of the 3-phase line.

Each controller includes a "forward" or "lift" relay winding 761 controlling three normally open pairs of switch contacts 763 which determine forward or lift rotation of the associated motor, and a "reverse" relay winding 765 controlling three normally open pairs of contacts 767 which determine reverse direction of rotation of the associated motor.

Energization of the controller relay windings 761, 765 as well as other operations, are controllable through a gang switch 781 and associated switches. The gang switch includes four 3-position single blade switches 783, 785, 787, 789, the center contact position being the "Off" position, while one end contact position is for manual operation and the remaining end position for automatic operation. The switches 783 and 785 are in parallel both as to their manual and automatic positions.

Specifically as to energizing of the "lift" relay winding 761 of the elevating means motor 609, for automatic operation, this is accomplished by way of a connection 795 from one side of the transformer secondary winding 751, through the parallel switches 783, 785 in their automatic positions, then by way of normally open contacts 797 of micro-switch 799 in parallel with normally open contacts 805 of a micro-switch 807 controlled by one of the dogs 711, then through normally closed contacts 809 of a micro-switch 811 and normally closed contacts 813 of a limit switch 815 to the "lift" winding 761.

From the "lift" winding, the circuit is completed back to the other side of the transformer secondary winding through two pairs of normally closed contacts 817, 818, associated with overload relays 819, 820 respectively.

The micro-switch 799 which also includes normally closed contacts 821, is mounted at the remote portion of the elevator section of the frame in position to have an associated actuator bar abutted by a stack of boxes when such stack is loaded onto the lift fork, to close the normally open contacts of said switch 799 and open its normally closed contacts 821. This condition will continue during subsequent lifting of the stack until the lowermost box rides past the actuator bar and frees the switch for restoration to its normal condition.

The micro-switch 807 which also includes normally closed contacts 827, will have its normally open contacts 805 closed and its normally closed contacts 827 open as long as such stack holds the associated dog in its "out" position. Normal condition of the contacts will be restored when the dogs are permitted to drop in under the stack to support the remaining boxes of a stack required to maintain production until a fresh stack can be provided.

Micro-switch 811 utilizes only a pair of normally closed contacts, and is mounted in position to be engaged by the uppermost box in the stack being processed, and its contacts opened by such engagement and closed upon such uppermost box being removed by the suction lift means. Thus the operation of this micro-switch will be intermittent so long as the rest of the circuit through the "lift" winding is closed and under such conditions will cause intermittent lifting of a stack toward the suction cup, whose cyclic operations control the intermittent rate. Such intermittent lifting will continue until the current flow to the "lift" winding is interrupted at some other point, which in normal operation, will occur when the dog associated with the micro-switch 807 drops in beneath the bottom box of a stack being processed.

The limit switch 815, is mounted at the upper limit of permissible movement of the lift fork and will open should the lift fork tend to exceed its permitted limit of travel, which tendency could occur if the lift fork is empty.

Interruption of the "lift" winding circuit during normal operation, at the dog controlled micro-switch 807 calls for return of the lift fork to its loading position for a fresh stack of unformed boxes, and this is effected by restoration of the series connected normally closed contacts 821 of the micro-switch 799 and contacts 827 of micro-switch 807, which complete a circuit through the "down" winding 765 of the elevating means controller 731.

This circuit may be traced from one side of the transformer secondary winding 751 through parallel connected switches 783, 785 in their automatic positions, and series connected normally closed contacts 827, 821, then through the normally closed component 835 of a two-circuit push button switch 837 to the switch 789 in its automatic position, and from there through normally closed contacts 843 of a micro-switch 845, the "down" winding 765 of the elevating means controller, and normally closed pairs of contacts 817, 818 to the other side of the transformer secondary winding 751. The resulting energization of the "down" winding 765 brings about reversal of the line connections to the motor 609 and reverses its direction of rotation, thereby lowering the lift fork toward its loading position.

The micro-switch 845 is located below the lift fork in position to be engaged thereby when the lift fork reaches loading position, at which moment, normally closed contacts of said micro-switch are opened to break the "down" winding circuit of the lift fork.

At the same time, a pair of normally open contacts 849 of said micro-switch 845 will close. At this point, such contacts close a circuit to the "forward" winding 761 of the feeder motor controller 733 which circuit may be traced from one side of the transformer secondary 751 through parallel switches 783, 785, series connected normally closed contacts 827, 821 of micro-switches 807 and 799 respectively, normally open contacts 851 of a limit switch 853, the normally closed contacts 855 of a limit switch 857, the normally open contacts 849 (now closed) of the micro-switch 845, to the "forward" winding of the feeder motor controller 733, and from there back to the transformer secondary winding 751 by way of series connected normally closed contacts 859, 860 of overload relays 861, 862 respectively of the controller.

Normally open contacts 851 of limit switch 853 will be closed if a stack is available in the feeder section, and consequently, without a stack in the feeder section, the pusher frame will not be driven toward the lift fork.

Limit switch 857 is located in the feeder section to be engaged by the pusher frame, should the frame for any reason tend to advance beyond the point normally required to feed a stack to the lift fork and into engagement with the micro-switch 799. Therefore, should the limit switch 857 be actuated, it will open the circuit to the forward winding of the feed motor controller and halt the operation. It will be appreciated, therefore, that the limit switch 857 is an emergency switch which does not function so long as the machine is operating in a normal manner.

Thus, with contacts 851 closed by a stack in the feeder section, the controller contacts 763 will close to energize the feeder motor in the forward direction.

At the same time, a pair of normally open holding contacts 866 in the controller 733 will close and establish a holding circuit across the contacts 851 of limit switch 853.

When a stack is thus fed to the lift fork, it engages a micro-switch 799 to close normally open contacts 797 in the circuit through the "lift" winding 761 of the elevating means motor controller 731 to start the motor 609 in the lift direction.

At the same time, the same contacts will close a circuit through the "return" winding 765 of the feeder motor controller 733 by way of normally closed contacts 863 of a limit switch 865 located at the "out" or starting position, to be engaged by the push frame to open the circuit through the "return" winding to stop the return travel of the push frame.

Energization of the "return" winding of the feeder motor controller, results also in closing a pair of normally open holding contacts 867 to close a holding circuit across contacts 797 and 805 of micro-switches 799 and 807 respectively.

Simultaneously, with return of the push frame, the push frame depresses a pair of normally open contacts 864 in limit switch 865 to energize the "forward" winding 761 of the conveyor motor controller 735, whose circuit may be traced from one side of the transformer secondary winding 751, through a three-position single blade switch 871, positioned for automatic operation, but having a position for manual operation, and an intermediate "off" position. From this switch, a connection runs through the normally closed component 875 of a two circuit push button load switch 877, then through the normally closed component 879 of a similar two circuit push button conveyor switch 881, to parallel connected normally closed contacts 883, 885 of limit switches 853, 889 respectively. From these contacts, the circuit extends to the normally open contacts 864 (now closed) of the limit switch 865, and from there through the "forward" coil 761 of the conveyor motor controller 733 and back to the transformer secondary winding 751 via series connected normally closed contacts 891 and 893.

Limit switch 889 is located in position to be engaged by a stack as it is moved by the conveyor from the loading end of the conveyor to a position intermediate that loading position and the feeder section. Being that the normally closed contacts of this limit switch are in parallel with the normally closed contacts 883 of limit switch 853, both must be opened to open the circuit through the "forward" winding of the conveyor motor controller. Consequently, absence of a stack at either the feeder section or the intermediate position or both will result in operation of the conveyor until these positions are supplied, and then only if limit switch 865 is engaged by the pusher frame to close contacts 864 which means that the pusher frame is in proper position for supplying the feeder section.

While the conveyor means is thus functioning to prepare the feeder section for the next loading of the elevating means, the elevating means is functioning to raise its stack toward the forming mechanism, in the course of which the stack will spread the dogs to "out" position and close normally open contacts 805 of the micro-switch 807 associated therewith, as previously described.

The elevating means will continue to lift until the stack depresses micro-switch 811 to open its normally closed contacts 809 and break the circuit to the "lift" winding. In this condition the stack is ready for approach of the suction cup 65.

The "down" stroke of the suction cup, it will be recalled, is initiated by energization of the solenoid 155. This solenoid is included in a circuit extending from one side of the transformer secondary winding 751, through switch 783 in automatic position, then by way of connecting line 901 to normally closed contacts 903 of micro-switch 905, then to normally open contacts 909 of micro-switch 911, and from there through the solenoid 155 back to the transformer secondary.

Micro-switch 905 is disposed in position to be engaged when a box is formed into the carriage, while micro-switch 911 is mounted in position to be engaged by the carriage in its outboard position. Thus in the outboard position of the carriage, the contacts 903 of micro-switch 905 being closed, the "down" solenoid 155 will be energized to condition valve 151 for supplying air under pressure to the upper end of the vacuum lift cylinder 73 to drive suction cup downwardly.

The solenoid 493 controlling the "out" position of the side flap flold-in levers 443, 445 is likewise connected through normally closed contacts 903 of micro-switch 905, but its circuit does not include micro-switch 911 and consequently is energized so long as there is no box in the carriage while the carriage is in its inboard position. This connects the air supply manifold 135 to air line 465 which feeds the side flap fold-in cylinders 453 to hold the levers out, and feeds the upper flap cylinder 521 in a direction to hold the plunger 533 in retracted position.

In the meantime, the vacuum pump motor 113 will have been connected to the 3-phase power line through a controller 925 by energization of the controller relay winding 927 which is connected across the transformer secondary winding 751 through the switch 783 and series connected normally closed pairs of contacts 929, 931.

The degree of vacuum is adjustable by manipulation of relief valve 129 at the intake side of the vacuum pump 111, and should be sufficient to shift the normally closed contacts 937 of a vacuum switch 939 following engagement of the cup with the uppermost box, the contacts 937 being in a circuit for energizing the solenoid 193 which, as previously indicated, will block the air line 177 at the valve 185 and exhaust the upper end of the cylinder to atmosphere, causing a rebound of the suction cup to a position of balance, due to the above-atmospheric pressure created in the lower end of the cylinder on the down stroke of the suction cup. This rebound, as described previously, serves to break away the top box of the stack from the adjacent one and partially open the top box as the initial step in the forming operation.

At the same time as normally closed contacts 937 of the vacuum switch 939 are opened to initiate the rebound of the suction cup, normally open contacts 941 of this same switch are closed, these contacts being in a circuit through the "lift" solenoid 157 associated with lifting of the suction cup, this circuit including normally open contacts 951 of a micro-switch 953, and the normally closed contacts 959 of a micro-switch 961.

Micro-switch 961 is disposed in position to be actuated by a box as it is formed into the carriage, while micro-switch 953 is located at the inboard position of the carriage to be actuated thereby upon return of the carriage to that position from its outboard position. Thus, at this moment, the circuit through the "lift" solenoid is complete except for the open contacts of micro-switch 953 and awaits return of the carriage, to become energized.

Return of the carriage from its outboard position is accomplished by closing of a pair of normally open contacts 971 located in the packer machine and actuated by raising of a chair arm 975 of the packer machine to receive a formed box, the chair arm, at the same time, also closing an additional pair of normally open contacts 975 to bring about release of the gripper means to permit of the discharge of the box and the return of the carriage.

The contacts 971 close a circuit through "return" solenoid 301, which, through its effect on valves 297 and 271 assures connection from the air supply manifold 135 to hollow piston rod 259, by way of air line 277, and thereby cause return of the carriage to its inboard position where it closes normally open contacts 951 to complete the "lift" solenoid circuit.

The contacts 975 close a circuit through solenoid 349 which, when thus energized, shifts valve 335 to cut off air flow to the drive end of the gripper cylinder 317 and connect such end to atmosphere, thus permitting the piston spring 325 to take over and retract the plunger and release the box.

With the carriage in its inboard position and promptly following the lifting of a box past the forming bars 221 and into the carriage, the box engages micro-switch 905 to open its normally closed contacts 903 to open the circuit to "down" solenoid 155 at this point, as well as the circuit through the solenoid 493, which, when energized, puts air into line 465. By disconnecting this solenoid 493, it enables switching of the air lines 463, 465 to the air supply and air exhaust manifolds. The actual switching occurs when the solenoid 481 is energized and this is made possible by simultaneous closing of a normally open pair of contacts 981 in micro-switch 905, which not only cause solenoid 481 to become energized, but also close a circuit through the solenoid 351 to actuate valve 335 of the gripper assembly to connect air to the drive end of the gripper cylinder 315, and thereby grip and hold the box in anticipation of de-vacuumizing the suction cup.

Release of the vacuum cup 65 is realized by energizing solenoid 373 which is accomplished by causing the box being formed in the carriage, to close normally open contacts 993 of another micro-switch 995 located in position to be so engaged.

With air now connected to air line 463, the flap spreader and the squaring cylinder will receive air at the drive end to drive their respective plunger forward and simultaneously square up the box being formed, and spread the upper and lower flaps thereof.

Neither the side flap folding mechanism nor the upper flap folding mechanism function with the flap spreader or squaring means because of the positions of their respective valves 521 and 571.

Valve 521, however, has its solenoid 525 controlled through a pair of open contacts 997 associated with the spreader bar 417 and a pair of closed contacts 999 associated with the piston of one of the side flap fold-in cylinders. Upon operation of the flap spreader means, the solenoid 525 will be energized, resulting in air from air line 463 being admitted to the drive end of each cylinder 463 to swing the fold-in levers inwardly.

In response to such action, closed contacts 999 will open and de-energize the solenoid 525 and cause associated valve 521 to connect the drive end of each cylinder 463 to atmosphere, leaving the fold-in levers in their "in" position.

Also associated with the same piston of one of the cylinders 463, are a pair of open contacts 1001 adapted to be closed upon actuation of the fold-in levers, and close a circuit through both the solenoid 513 which controls the flap spreader and the squaring cylinder assembly, and the solenoid 575 which controls the upper flap folding in means.

Resulting energizing of the flap spreader and squaring means solenoid 513, shifts its associated valve 511 and connects air supply to the spring side of the piston in each cylinder 421 and 397 to aid the springs therein in retracting their respective plungers with dispatch.

The solenoid 575 which controls the upper flap folding mechanism, shifts its associated valve 571 to connect air to the drive end of the cylinder 531 to propel the plunger 533 downwardly against the upper flap latching mechanism, whereby the upper flap will be folded down and latched in that position.

With the box thus formed, it is ready to be discharged to the packer machine. To accomplish this requires but an energizing current to the "out" solenoid 287 controlling out travel of the carriage to its outboard position. The circuit through said solenoid includes the normally open contacts 993 of the micro-switch 995 and normally open contacts 1005 located in the packer machine and closed by the chair arm of this machine when in its "down" position and is timed to occur following operation of the upper flap fold down mechanism. Contacts 993 of the micro-switch 995 are already closed due to the presence of a box in the carriage.

Thus the carriage with the box securely gripped therein will move outwardly, in the course of which, the box will lose contact with micro-switch 995 and permit its contacts to open and de-energize "out" solenoid 287. However, outward travel of the carriage will continue, for the valve 271 controlled by "out" solenoid 287 and "in" solenoid 301, responds only to energization of these solenoids.

When the box is deposited on the nose of the packer machine, the chair arm rises to fold up the lower flap, and release the gripper mechanism and close a return circuit through the "in" solenoid 301, all as previously indicated. Thus, the machine will continue to cycle.

Various manually operated switches may be provided and are depicted in the drawings, the purpose of which are to enable an operator to manually control any of the cyclic operations of the machine. These, except for prior reference to any of these switches, are not essential to the basic principles underlying the present invention.

Of special importance in the operation of the machine is the fact that the stroke of the suction cup, within its normal range of operation, is not fixed, but is determined by engagement with the uppermost box in the stack being processed, and, therefore, can be and is variable for a portion of the period occupied in processing a stack.

Thus, for example, so long as the lift fork is operating in conjunction with the micro-switch 811 to intermittently feed the stack, the suction cup stroke will be the same. However, when the dogs 711 fall in beneath the stack to permit the lift fork to return for a fresh stack, the stack remains stationary. Consequently, the suction cup must increase its stroke slightly for each succeeding box until the lift fork again takes over, and such ability to automatically adjust its stroke is an exceedingly important feature of the present invention.

Thus, while I have illustrated and described my invention in its preferred form, the same is subject to alteration and modification without departing from the underlying principles involved, and I accordingly do not desire to limit myself to the specific details illustrated and described except as may be necessitated by the appended claims.

I claim:

1. In a box forming machine, means for elevating from a loading position, a stack of collapsed boxes of the type having at one end, a pair of opposing inner flaps and a pair of opposing outer flaps; means for lifting successive individual boxes from such stack for processing, as such stack is elevated; means for returning to said loading position, said elevating means, when such stack has been depleted to a fixed number sufficient to maintain said machine productive until reloaded, while supporting said fixed number by the lowermost box thereof and independently of said elevating means for operation thereon by said machine; and means for loading a stack of collapsed boxes onto said elevating means when said elevating means is in loading position.

2. In a box forming machine, means for elevating from a loading position, a stack of collapsed boxes of the type having at one end, a pair of opposing inner flaps and a pair of opposing outer flaps; means for lifting successive individual boxes from such stack as they are elevated, and expanding the same to substantially open condition; means for spreading said opposing outer flaps to permit folding in of said opposing inner flaps; means for folding in said inner flaps; means responsive to said folding in means, for folding in at least one of said outer flaps; carriage means for conveying each such box out of said machine in its formed condition, said carriage means including as a component thereof, releasable means for pressure gripping such box to retain the same in said carriage during movement of said carriage; means for returning to said loading position, said elevating means, when such stack has been depleted to a fixed number sufficient to maintain said machine productive until reloaded, while supporting said fixed number for operation thereon by said machine; and feeder means for loading a stack of collapsed boxes onto said elevating means when said elevating means is in loading position.

3. In a box forming machine, means for elevating from a loading position, a stack of collapsed boxes of the type having at one end, a pair of opposing inner flaps and a pair of opposing outer flaps; means for lifting successive individual boxes from such stack as such stack is elevated, and expanding the same to substantially open condition; means for spreading said opposing outer flaps to permit folding in of said opposing inner flaps; means for folding in said inner flaps; means responsive to said folding in means, for folding in at least one of said outer flaps; carriage means for conveying each such box out of said machine in its formed condition, said carriage means including as a component thereof, releasable means for pressure gripping such box to retain the same in said carriage during movement of said carriage; means for returning to said loading position, said elevating means, when such stack has been depleted to a fixed number sufficient to maintain said machine productive until reloaded, while supporting said fixed number for operation thereon by said machine; feeder means for loading a stack of collapsed boxes onto said elevating means when said elevating means is in loading position; and means for supplying said feeder means with a fresh stack of collapsed boxes when said loading means is empty and in preparation for a subsequent loading operation.

4. In a box forming machine, means for elevating from a loading position, a stack of collapsed boxes of the type having at one end, a pair of opposing inner flaps and a pair of opposing outer flaps; means for successively lifting individual boxes from such stack and expanding the same to partially open condition, said last means including a cylinder, a piston in said cylinder having a piston rod extending longitudinally of said cylinder and terminating at one end in a suction head, said suction head comprising a suction cup for engagement with the uppermost box of such stack means for driving said suction head into contact with said uppermost box, means for developing sub-atmospheric pressure in said suction head, means for developing a higher than atmospheric back pressure against said piston; and means following such contact for reducing the pressure above said piston to a value below said back pressure, whereby the resulting rebound of said piston to a position of balance will cause said suction head to move a limited distance upwardly to effect separation of the uppermost box from the stack in preparation for completion of the lifting operation.

5. In a box forming machine, means for elevating from a loading position, a stack of collapsed boxes of the type having at one end, a pair of opposing inner flaps and a pair of opposing outer flaps; means for successively lifting individual boxes from such stack as they are elevated, and expanding the same to partially open condition, said last means including a cylinder, a piston in said cylinder having a piston rod extending longitudinally of said cylinder and terminating at one end in a suction head, said suction head comprising a suction cup for engagement with the uppermost box of such stack, means for supplying air under pressure to said cylinder above the range of movement of said piston to drive said suction head into contact with said uppermost box, an air line leading from said cylinder below the range of movement of said piston, means for developing sub-atmospheric pressure in said suction head following contact thereof with said box, means for developing a higher than atmospheric pressure in said cylinder below said piston to develop pneumatic pressure beneath said piston, and means following such contact for disconnecting said air pressure supply means and exposing the upper end of said cylinder to a pressure less than that beneath said piston, whereby the resulting rebound of said piston to a position of balance will cause said suction head to move a limited distance upwardly to effect separation of the uppermost box from the stack in preparation for completion of the lifting operation; and means for supplying air under pressure to said cylinder below said piston to complete said lifting operation.

6. In a box forming machine, means for elevating from a loading position, a stack of collapsed boxes of the type having at one end, a pair of opposing inner flaps and a pair of opposing outer flaps; means for successively lifting individual boxes from such stack as they are elevated, and expanding the same to partially open condition, said last means including a cylinder, a piston in said cylinder having a hollow piston rod extending longitudinally of said cylinder and terminating at one end in a suction head, said suction head comprising a suction cup for engagement with the uppermost box of such stack, means for supplying air under pressure to said cylinder above the range of movement of said piston to drive said suction head into contact with said uppermost box, an air line leading from said cylinder below the range of movement of said piston, means for developing sub-atmospheric pressure in said suction head following contact thereof with said box, means for developing a higher than atmospheric pressure in said cylinder below said piston pneumatic pressure beneath said piston, and means following such contact for disconnecting said air pressure supply means and exposing the upper end of said cylinder to a pressure less than that prevailing beneath said piston, whereby the resulting rebound of said piston to a position of balance will cause said suction head to move a limited distance upwardly to effect separation of the uppermost box from the stack in preparation for completion of the lifting operation; and means for supplying air under pressure to said cylinder below said piston to complete said lifting operation.

7. In a box forming machine, means for supporting a stack of horizontal disposed collapsed boxes of the type having at one end, a pair of opposing inner flaps and a pair of opposing outer flaps; a carriage adapted to receive and releasably suspended a box in its formed condition; means for successively lifting individual boxes from such stack and unfolding the same into said carriage; means for spreading said opposing outer flaps to permit of folding in of said opposing inner flaps while a box is suspended from said carriage; means for folding in said opposing inner flaps; means for folding in and releasably holding at least one of said opposing outer flaps; and means for moving said carriage and box while still suspended from said carriage, to a discharge position in said machine.

8. In a box forming machine, means for supporting a stack of horizontally disposed collapsed boxes of the type having at one end, a pair of opposing inner flaps and a pair of opposing outer flaps; a carriage adapted to receive and releasably suspend a box in its formed condition; means for successively lifting individual boxes from such stack and unfolding the same into said carriage; means for spreading said opposing outer flaps to permit of folding in of said opposing inner flaps while a box is suspended from said carriage; means for folding in said opposing inner flaps while withdrawing said spreading means; means for folding in and releasably holding at least one of said opposing outer flaps; and means for moving said carriage and box while still suspended from said carriage, to a discharge position in said machine.

9. In a box forming machine, means for supporting a stack of horizontally disposed collapsed boxes of the type having at one end, a pair of opposing inner flaps and a pair of opposing outer flaps; a carriage adapted to receive and releasably suspend a box in its formed condition; means for successively lifting individual boxes from such stack and unfolding the same into said carriage; means for spreading said opposing outer flaps to permit of folding in of said opposing inner flaps while a box is suspended from said carriage; means for folding in said opposing inner flaps; means for folding in and releasably holding one of said opposing outer flaps; means for moving said carriage and box while still suspended from said carriage, to a discharge position in said machine; means for folding in the remaining of said opposing outer flaps; and means for releasing such box for discharge from said machine.

10. In a box forming machine, carriage means for receiving and suspending a box in its formed condition and delivering the same out of said machine, a carriage slidably supported on said rails, said carriage including a plate having spaced opposing side flanges between which to loosely position such formed box, and means for releasably pressuring such box against one of said flanges when so positioned between said flanges, said means comprising a cylinder mounted on one of said flanges, a piston in said cylinder and means coupled to said piston and directed toward the proximate side of said box for engagement therewith upon actuation of said piston to force such box into pressure engagement with the opposing flange.

11. In a box forming machine, means for elevating from a loading position, a stack of collapsed boxes, means for successively lifting individual boxes from such stack for forming such boxes individually; means responsive to the arrival of said elevating means at a predetermined elevation, for returning said elevating means to its loading position; feeder means responsive to the return of said elevating means to its loading position, for conveying a fresh stack of collapsed boxes to said elevating means; means for holding a plurality of such stacks in reserve; and means responsive to removal of a stack from said feeder means, for supplying a stack thereto from said reserve stacks.

12. In a box forming machine, means for elevating from a loading position, a stack of collapsed boxes of the type having at one end, a pair of opposing inner flaps and a pair of opposing outer flaps, said elevating means including a bottom support of a size to leave bottom edge portions of the lowermost box in such stack exposed; means for successively lifting individual boxes from such stack; and means, upon reducing such stack to a predetermined number, for engaging the said bottom exposed portions of said lowermost box for supporting said predetermined number by the lowermost box thereof and independently of said elevating means to permit said elevating means to return for reloading; and means for returning said elevating means to its loading position; said predetermined number being such as to assure continued production of said machine during reloading and elevating a fresh stack of such collapsed boxes.

13. In a box forming machine, means for elevating from a loading position, a stack of collapsed boxes of the type having at one end, a pair of opposing inner flaps and a pair of opposing outer flaps, said elevating means including a bottom support of a size to leave bottom edge portions of the lowermost box in such stack exposed; means for successively lifting individual boxes from such stack as they are elevated; and means, upon reducing such stack to a predetermined number, for supporting said predetermined number independently of said elevating means to permit said elevating means to return for reloading; said supporting means including dog elements spring biased into the path of movement of a stack and held outwardly of said path by a stack being elevated, said dog elements being adapted to close in under the said exposed bottom edge portions of such stack when said stack rises above said dog elements, and means for returning said elevating means to its loading position; said predetermined number being such as to assure continued production of said machine during reloading and elevating a fresh stack of such collapsed boxes.

14. In a box forming machine, means for elevating from a loading position, a stack of collapsed boxes of the type having at one end, a pair of opposing inner flaps and a pair of opposing outer flaps; suction means for successively lifting individual boxes from such stack as they are elevated; and means, upon reducing such stack to a predetermined number, for supporting said predetermined number by the lowermost box thereof and independently of said elevating means to permit said elevating means to return for reloading; and means for returning said elevating means to its loading position; said predetermined number being such as to assure continued production of said machine during reloading and elevating a fresh stack of such collapsed boxes.

15. In a box forming machine, means for elevating from a loading position, a stack of collapsed boxes of the carton type adapted to be expanded into open condition, means for lifting successive individual boxes from such stack as such stack is elevated and expanding the same to substantially open condition, said elevating means including means for successively raising the uppermost box in a stack to a maximum predetermined height following removal of each box from such stack, until such stack has been depleted to a fixed number sufficient to maintain said machine productive until reloaded; means for returning said elevating means for reloading while supporting said fixed number for operation thereon by said machine; said means for lifting successive individual boxes from such stack, continuing to lift successive boxes from said fixed number at increasing distances below said maximum predetermined height, while said elevating means is being reloaded.

16. In a box forming machine, means for supporting a stack of boxes in collapsed condition for processing; means for successively lifting individual boxes from such stack for forming the same, said last means including a cylinder, a piston in said cylinder having a piston rod extending longitudinally of said cylinder and terminating at one end in a suction head, said suction head comprising a suction cup for engagement with the uppermost box of such stack, means for driving said suction head into contact with said uppermost box, means for developing subatmospheric pressure in said suction head, means for developing a higher than atmospheric back pressure against said piston; and means following such contact for reducing the pressure above said piston to a value below said back pressure, whereby the resulting rebound of said piston to a position of balance will cause said suction head to move a limited distance upwardly to effect separation of the uppermost box from the stack.

17. In a box forming machine, means for elevating from a loading position, a stack of collapsed boxes of the type having at one end, a pair of opposing inner flaps and a pair of opposing outer flaps; means for successively lifting individual boxes from such stack and expanding the same to partially open condition, said last means including a cylinder, a piston in said cylinder having a piston rod extending longitudinally of said cylinder and terminating at one end in a suction head, said suction head comprising a suction cup for engagement with the uppermost box of such stack, means for driving said suction head into contact with said uppermost box, means for developing subatmospheric pressure in said suction head, means for developing a higher than atmospheric back pressure against said piston; and means following such contact for reducing the pressure above said piston to a value below said back pressure, whereby the resulting rebound of said piston to a position of balance will cause said suction head to move a limited distance upwardly to effect separation of the uppermost box from the stack in preparation for completion of the lifting operation; means, upon reducing such stack to a predetermined number, for supporting said predetermined number independently of said elevating means to permit said elevating means to return for reloading; and means for returning said elevating means to its loading position; said predetermined number being such as to assure continued production of said machine during reloading and elevating a fresh stack of such collapsed boxes.

References Cited in the file of this patent
UNITED STATES PATENTS

| Number | Name | Date |
|---|---|---|
| 2,280,773 | Ferguson | Apr. 28, 1942 |
| 2,460,892 | Lisle | Feb. 8, 1949 |
| 2,521,996 | Ray et al. | Sept. 12, 1950 |
| 2,563,450 | Battey | Aug. 7, 1951 |
| 2,598,222 | Cahners et al. | May 27, 1952 |
| 2,645,365 | Haessler | July 14, 1953 |
| 2,739,717 | Dinsmore et al. | Mar. 27, 1956 |
| 2,765,715 | Kerr | Oct. 9, 1956 |
| 2,780,148 | Pearson et al. | Feb. 5, 1957 |
| 2,809,034 | Koch | Oct. 8, 1957 |
| 2,826,411 | Monroe et al. | Mar. 11, 1958 |
| 2,840,375 | Kerr et al. | June 24, 1958 |
| 2,844,263 | Dreyer | July 22, 1958 |
| 2,851,837 | Ardell et al. | Sept. 16, 1958 |
| 2,900,186 | Schwebel | Aug. 18, 1959 |
| 2,912,243 | Gulick | Nov. 10, 1959 |